US011475536B2

(12) United States Patent
Liu et al.

(10) Patent No.: US 11,475,536 B2
(45) Date of Patent: Oct. 18, 2022

(54) CONTEXT-AWARE SYNTHESIS FOR VIDEO FRAME INTERPOLATION

(71) Applicant: Portland State University, Portland, OR (US)

(72) Inventors: Feng Liu, Portland, OR (US); Simon Niklaus, Portland, OR (US)

(73) Assignee: PORTLAND STATE UNIVERSITY, Portland, OR (US)

( * ) Notice: Subject to any disclaimer, the term of this patent is extended or adjusted under 35 U.S.C. 154(b) by 60 days.

(21) Appl. No.: 16/971,478

(22) PCT Filed: Feb. 22, 2019

(86) PCT No.: PCT/US2019/019285
§ 371 (c)(1),
(2) Date: Aug. 20, 2020

(87) PCT Pub. No.: WO2019/168765
PCT Pub. Date: Sep. 6, 2019

(65) Prior Publication Data
US 2020/0394752 A1    Dec. 17, 2020

Related U.S. Application Data

(60) Provisional application No. 62/635,675, filed on Feb. 27, 2018.

(51) Int. Cl.
*G06T 3/00* (2006.01)
*G06N 3/08* (2006.01)
(Continued)

(52) U.S. Cl.
CPC ............ *G06T 3/0093* (2013.01); *G06N 3/08* (2013.01); *G06N 5/046* (2013.01); *G06T 3/4007* (2013.01);
(Continued)

(58) Field of Classification Search
CPC ....... G06T 3/0093; G06T 3/4007; G06T 5/50; G06T 2207/20081; G06T 2207/20084;
(Continued)

(56) References Cited

U.S. PATENT DOCUMENTS 6,570,624 B2 *  5/2003  Cornog ................ H04N 7/014
348/E7.013
8,031,977 B2 * 10/2011  Min ..................... G06T 3/4007
358/463
(Continued)

OTHER PUBLICATIONS

Zhe Ren et al., "Unsupervised Deep Learning for Optical Flow Estimation", In: Proceedings of the Thirty-First AAAI Conference on Artificial Intelligence, San Francisco, CA, USA Feb. 4-19, 2017, pp. 1495-1501, see pp. 1495-1500. (Year: 2017).*
(Continued)

*Primary Examiner* — Van D Huynh
(74) *Attorney, Agent, or Firm* — Schwabe, Williamson & Wyatt, P.C.

(57) ABSTRACT

Systems, methods, and computer-readable media for context-aware synthesis for video frame interpolation are provided. Bidirectional flow may be used in combination with flexible frame synthesis neural network to handle occlusions and the like, and to accommodate inaccuracies in motion estimation. Contextual information may be used to enable frame synthesis neural network to perform informative interpolation. Optical flow may be used to provide initialization for interpolation. Other embodiments may be described and/or claimed.

25 Claims, 12 Drawing Sheets

(51) Int. Cl.
*G06N 5/04* (2006.01)
*G06T 3/40* (2006.01)
*G06T 5/50* (2006.01)

(52) U.S. Cl.
CPC ...... *G06T 5/50* (2013.01); *G06T 2207/20081* (2013.01); *G06T 2207/20084* (2013.01); *G06T 2207/20224* (2013.01)

(58) Field of Classification Search
CPC ............ G06T 2207/20224; G06N 3/08; G06N 5/046; G06N 3/0454; G06N 3/0481; H04N 7/0127
USPC ........................................................ 382/100
See application file for complete search history.

(56) References Cited

U.S. PATENT DOCUMENTS

| | | | |
|---|---|---|---|
| 10,424,069 B2* | 9/2019 | Sun | G06T 7/97 |
| 2008/0085056 A1* | 4/2008 | Souchard | H04N 19/577 |
| | | | 375/E7.256 |
| 2010/0315505 A1* | 12/2010 | Michalke | G06T 7/251 |
| | | | 348/118 |
| 2017/0186176 A1* | 6/2017 | Paluri | G06V 10/758 |
| 2017/0221218 A1* | 8/2017 | Taggart | G06T 7/207 |
| 2018/0268208 A1* | 9/2018 | Wei | G06V 20/58 |
| 2019/0057509 A1* | 2/2019 | Lv | G06T 7/90 |
| 2019/0138889 A1* | 5/2019 | Jiang | G06T 7/251 |

OTHER PUBLICATIONS

Zhe Ren et al., "Unseprvised Deep Learning for Optical Flow Estimation", In: Proceedings of the Thirty-First AAAI Conference on Artifical Intelligence, San Francisco, CA, USA Feb. 4-19, 2017, pp. 1495-1501, see pp. 1495-1500.
Written Opinion of PCT/US2019/019285 (dated Jun. 13, 2019).

\* cited by examiner

CONTEXT-AWARE SYNTHESIS FOR VIDEO FRAME INTERPOLATION

CROSS REFERENCE TO RELATED APPLICATIONS

The present application is a national phase entry under 35 U.S.C. § 371 of Int'l App. No. PCT/US2019/019285 filed Feb. 22, 2019, entitled "CONTEXT-AWARE SYNTHESIS FOR VIDEO FRAME INTERPOLATION," which designated, among the various States, the United States of America, and which claims priority to U.S. Provisional App. No. 62/635,675 filed Feb. 27, 2018, each of which are hereby incorporated by reference in their entireties.

STATEMENT REGARDING FEDERALLY SPONSORED RESEARCH

The present invention was made with government support under award number 1321119 awarded by the National Science Foundation (NSF) Division of Information and Intelligent Systems (IIS). The government has certain rights in the invention.

FIELD

Various embodiments generally may relate to the fields of signal processing and computer vision, and in particular, may relate to video frame interpolation via adaptive convolution.

BACKGROUND

Video frame interpolation is a basic video processing technique that is used to generate intermediate frames between any two consecutive original frames. Video frame interpolation algorithms typically estimate optical flow or its variations and use them to warp and blend original frames to produce interpolation results [R01, R23, R31].

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Video frame interpolation algorithms typically estimate optical flow or its variations and then use it to guide the synthesis of an intermediate frame between two consecutive original frames. To handle challenges like occlusion, bidirectional flow between the two input frames is often estimated and used to warp and blend the input frames. However, effectively blending the two warped frames still remains a challenging problem. Embodiments herein provide a context-aware synthesis approach that warps not only the input frames but also their pixel-wise contextual information and uses them to interpolate a high-quality intermediate frame. In embodiments, a pre-trained neural network may be used to extract per-pixel contextual information for input frames. A conventional optical flow algorithm may be used to estimate bidirectional flow between them and pre-warp both the input frames and their context maps. Finally, unlike conventional approaches that blend the pre-warped frames, in various embodiments, the input frames and their context maps may be fed to a video frame synthesis neural network to produce the interpolated frame in a context-aware fashion. The neural network of the embodiments herein is fully convolutional and is trained end to end. Experiments show that the embodiments can handle challenging scenarios such as occlusion and large motion, and can outperform conventional approaches.

1. INTRODUCTION

Video frame interpolation is a video processing technique that is used to generate intermediate frames between any two consecutive original frames. The term "interpolation" may refer to a process or procedure for constructing new data points within a range of a discrete set of known data points. Video frame interpolation algorithms typically estimate optical flow or its variations and use them to warp and blend original frames to produce interpolation results. Warping may refer to a process of digitally manipulating an image (or video), such that one or more shapes portrayed in the image are distorted.

Figure 1:
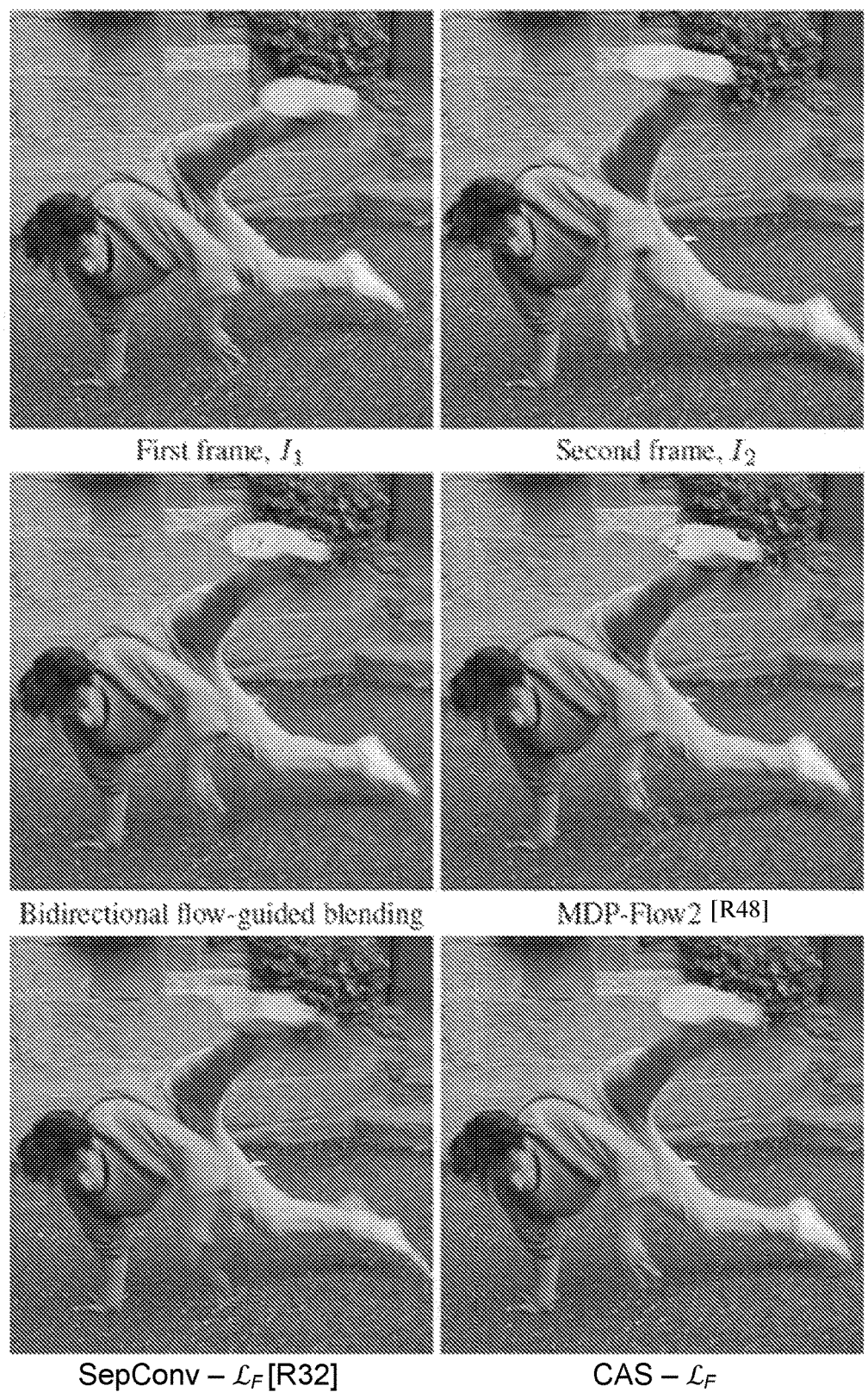
FIG. 1 depicts frames produced using various frame interpolation methods.

The quality of frame interpolation results depends heavily on that of optical flow. While these years have observed great progress of research on optical flow, challenges such as occlusion and large motion still remain. As reported in recent work, the optical flow accuracy decreases as the motion increases [R04, R16]. Therefore, many frame interpolation methods estimate bidirectional optical flow between two input frames and use them to handle inaccuracies of motion estimation and occlusion [R14, R35, R50]. Some of the recent bidirectional approaches [R50], also estimate weight maps to adaptively blend the optical flow-guided warped frames. However, as shown in FIG. 1, blending the warped frames sometimes is limited in handling occlusion and inaccuracies of optical flow, as it requires accurate pixel-wise correspondence between the warped frames. In FIG. 1, the frame labeled "CAS" may be a frame produced using the Context-Aware Synthesis (CAS) embodiments discussed herein.

Embodiments herein provide a context-aware frame synthesis approach to high-quality video frame interpolation. Instead of blending pre-warped input frames, various embodiments herein may adopt a more flexible synthesis mechanism that can better handle inaccuracies of optical flow and occlusion. In particular, embodiments may include a frame synthesis deep neural network that directly produces an intermediate frame from the pre-warped frames, without limiting to pixel-wise blending. To further improve the interpolation quality, various embodiments may employ a pre-trained image classification neural network [R13] to extract per-pixel context information from input frames. These context maps may be pre-warped together with the input frames guided by bidirectional optical flow. The frame synthesis neural network takes the pre-warped frames and their context maps as input and is able to handle challenging scenarios such as significant occlusion and motion to produce high-quality interpolation results. As used herein, the term "pre-warping" may refer to an image manipulation process that moves pixels in a source image to desirable locations in a target (output) image, and/or by (re-)positioning pixels in a source image to be in alignment with an output image.

Experiments show that the embodiments herein are able to handle difficult frame interpolation cases and produce higher quality results than existing approaches [R23, R29, R31, R48]. On the Middlebury interpolation benchmark, the embodiments generate the best results among all the published ones [R01]. The capability of the embodiments to produce high-quality interpolation results may be due to the following factors. First, the frame synthesis neural network of the embodiments herein is not limited to pixel-wise blending. It is able to make use of neighboring pixels for frame synthesis, which is important to handle occlusion and errors in optical flow. Second, the extracted and pre-warped context maps provide extra information in addition to motion and enables the neural network to perform informative frame synthesis. Finally, some embodiments may use PWC-Net [R41] to estimate the bidirectional flow, which provides a good initialization.

2. RELEVANT WORK

Video frame interpolation is a classic computer vision problem. While it is a constrained problem of novel view interpolation [R18, R42], a variety of dedicated algorithms have been developed for video frame interpolation.

Classic video frame interpolation algorithms typically include two steps: optical flow estimation and frame interpolation [R01, R46, R49]. The quality of frame interpolation largely depends on that of optical flow, which is one of the basic problems in computer vision and has been attracting a significant amount of research effort. These years, the quality of optical flow has been consistently improved [R01, R04, R16, R28]. Similar to many other computer vision problems, deep learning approaches are used in various high-quality optical flow algorithms [R08, R10, R41, R45, R47]. However, optical flow is inherently a difficult problem and challenges still remain in many scenarios, such as significant occlusion, large motion, lack of texture, and blur. Optical flow results are often error-prone when facing these difficult cases.

Various approaches have been developed to handle the inaccuracies and missing information from optical flow results. For example, the approach discussed in [R01] fills the holes in the optical flow results before using them for interpolation. Another category of approaches estimate bidirectional optical flow between two input frames and use them to improve the accuracy and infer missing motion information due to occlusion [R14, R35, R50]. Some recent methods also estimate per-pixel weight maps to better blend the flow-guided pre-warped frames than using global blending coefficients [R50]. These methods have been shown effective; however, their performance is sometimes limited by the subsequent interpolation step that blends the pre-warped frames to produce the final result. Some embodiments herein may build upon these bidirectional flow approaches and may extend them by developing a deep frame synthesis neural network that is not limited to pixel-wise blending, and thus, these embodiments are more flexible to tolerate errors in optical flow. Moreover, the various embodiments herein may extract and warp pixel-wise contextual maps together with input frames, and may feed them to the deep neural network to enable context-aware frame synthesis.

Several recent methods interpolate video frames without estimating optical flow. For example, [R29] developed a phase based frame interpolation approach that generates intermediate frames through per-pixel phase modification. [R24] directly trained a deep convolutional neural network that takes two consecutive original frames as input and output an intermediate frame without an intermediate motion estimation step; their results, however, are sometimes blurry. [R31, R32] merged motion estimation and pixel synthesis into a single step of local convolution and employ a deep convolutional neural network to estimate a pair of convolution kernels for each output pixel and then use them to convolve with input frames to produce an intermediate frame. While their methods can handle occlusion and reasonable size motion, they still cannot handle large motion. [R23] developed a deep neural network to extract voxel flow that is used to sample the space-time video volume to generate the interpolation result. As their method samples the $2^3$ spatial-temporal neighborhood according to the voxel flow, it is still limited in accommodating inaccuracies in motion/voxel flow estimation.

3. EXAMPLE EMBODIMENTS OF VIDEO FRAME INTERPOLATION

Figure 2:
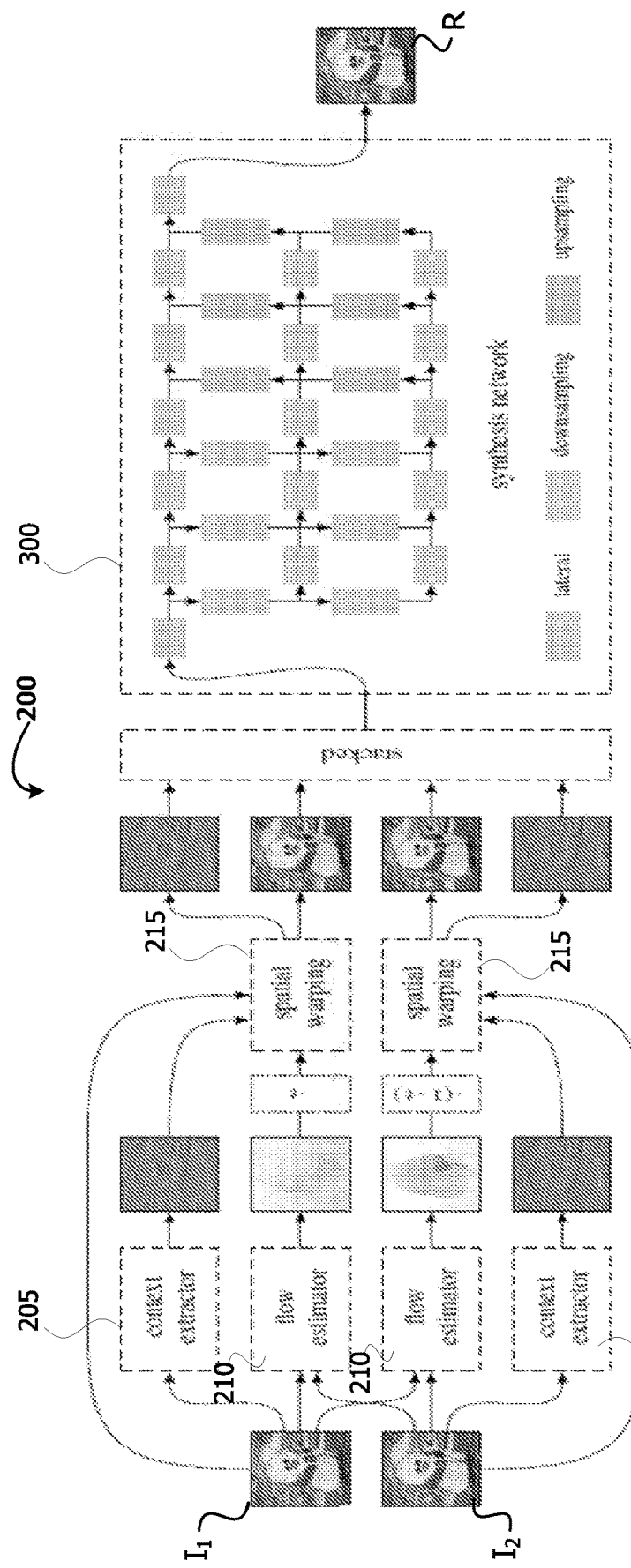
FIG. 2 depicts an example Context-Aware Synthesizer (CAS) architecture according to various embodiments.

FIG. 2 depicts an overview of an example Context-Aware Synthesizer (CAS) architecture 200 according to various embodiments. The CAS architecture 200 (or simply "CAS 200") is context-aware synthesis neural network that warps not only the input frames but also their pixel-wise contextual information and uses them to interpolate a high-quality intermediate frame. As shown by FIG. 2, the CAS 200 includes content extractors 205, optical flow estimators (OFEs) 210, spatial warping engines (SWEs) 215, and frame synthesis neural network (FSN) 300.

Given two consecutive video frames $I_1$ and $I_2$, a goal may to generate an intermediate frame $\hat{I}_t$ at the temporal location t in between the two input frames. Given two consecutive input frames $I_1$ and $I_2$, the OFEs 210 first estimate bidirectional flows between the two consecutive input frames $I_1$ and $I_2$, and the context extractors 205 extract per-pixel context maps that correspond to respective ones of the input frames $I_1$ and $I_2$. The SWEs 215 then pre-warp the input frames $I_1$ and $I_2$ and their corresponding context maps. The warped frames and context maps are then be fed into the FSN 300 to generate the interpolate result R at a desirable temporal position $t \in [0, 1]$.

As mentioned previously, the OFEs 210 estimate bidirectional optical flow between the input frames $I_1$ and $I_2$. The OFEs 210 are software engines, modules, objects, or other like logical units that perform motion estimation for frame interpolation. In other implementations, the OFEs 215 may be hardware elements configured with an appropriate bit stream, logic blocks, or the like to perform motion estimation for frame interpolation. In various embodiments, the motion estimation is performed explicitly through optical flow; however, in other embodiments the motion estimation may be done implicitly through adaptive convolution. Optical flow estimation uses precise per-pixel localization and finds correspondences between two input images, which involves not only learning image feature representations, but also learning to match them at different locations in the two images. In other words, an optical flow describes how pixels move between images, which may include a data structure that indicates pixel correspondences between two images (or video frames). In some embodiments, the OFEs 210 estimate the bidirectional optical flow $F_{1 \to 2}$ and $F_{2 \to 1}$ between the two frames using Pyramidal processing, Warping, and Cost volume-Network (PWC-Net) [R41], which utilizes a multi-scale feature pyramid in combination with warping and cost volumes. PWC-Net performs well in standard benchmarks while at the same time being computationally efficient.

The CAS may then warp the input frames together with their context maps according to the optical flow. Guided by the bidirectional flow, the CAS may pre-warp the input frames. In particular, the CAS may employ forward warping that uses optical flow $F_{1 \to 2}$ to warp input frame $I_1$ to the target location and obtain a pre-warped frame $\hat{I}_t^1$. During forward warping, the SWEs 215 may measure the flow quality by checking the brightness constancy and discard the contributions of the flows that significantly violate this constraint. The CAS may warp input frame $I_2$ and generate the pre-warping frame $\hat{I}_t^2$ in the same or similar way. Note that advanced bidirectional warping approaches may not be used and the FSN 300 may improve the interpolation results by utilizing the complementary information from the pre-warped frames.

Finally, the CAS may feed the warped input frames and corresponding context maps into a deep FSN 300 to generate the interpolation result R.

3.1. Context-Aware Frame Synthesis

Given two pre-warped frames $\hat{I}_t^1$ and $\hat{I}_t^2$, existing bidirectional methods combine them through weighted blending into the final interpolation result $\hat{I}_t$. This pixel-wise blending approach requires pixel-wise accuracy of optical flow. Embodiments may develop a more flexible approach by training a synthesis neural network that takes the two pre-warped images as input and directly generates the final output, without resorting to pixel-wise blending. In this way, the embodiments herein can better tolerate inaccuracies of optical flow estimation.

Generating the final interpolation result R only from the two pre-warped frames has a limitation in that rich contextual information from the original frames is lost. Note that the contextual information for each pixel in pre-warped frames could be compromised due to errors in optical flow. Therefore, according to various embodiments, the content extractors 205 extract per-pixel context maps from the original input frames, which may be warped together with the input frames, before being fed into the FSN 300 as shown by FIG. 2. In some embodiments, the content extractors 205 extract the contextual information utilizing the response of a convolution layer (conv1) from an 18 layer residual network (ResNet-18) [R13]. Each pixel in the input frame accordingly has a contextual vector that describes its 7×7 neighborhood. Note that the stride of the conv1 layer may be modified to be 1 instead of 2 such that the context map has the same size as its corresponding input frame.

In embodiments, the CAS 200 may extend a grid network (GridNet) architecture to generate the final interpolation result R from the two pre-warped frames and their context maps [R09]. Instead of having a single sequence of consecutive layers like typical neural networks, the GridNet that is utilized by the CAS 200 may process features in a grid of three rows and six columns as shown by FIG. 2. The layers in each row form a stream in which the feature resolution is kept constant. Each of the three streams processes information at a different scale and the columns connect the streams to exchange information by using down-sampling and upsampling layers. This generalizes typical contraction-expansion architectures in which features are processed along a single path [R25, R34]. In comparison, the GridNet learns how information at different scales should be combined on its own, making it well-suited for pixel-wise problems where global low-resolution information guides local high-resolution predictions. In various embodiments, the CAS may include modified versions of the horizontal and vertical connections of the GridNet architecture, which is shown by FIG. 3.

Figure 3:
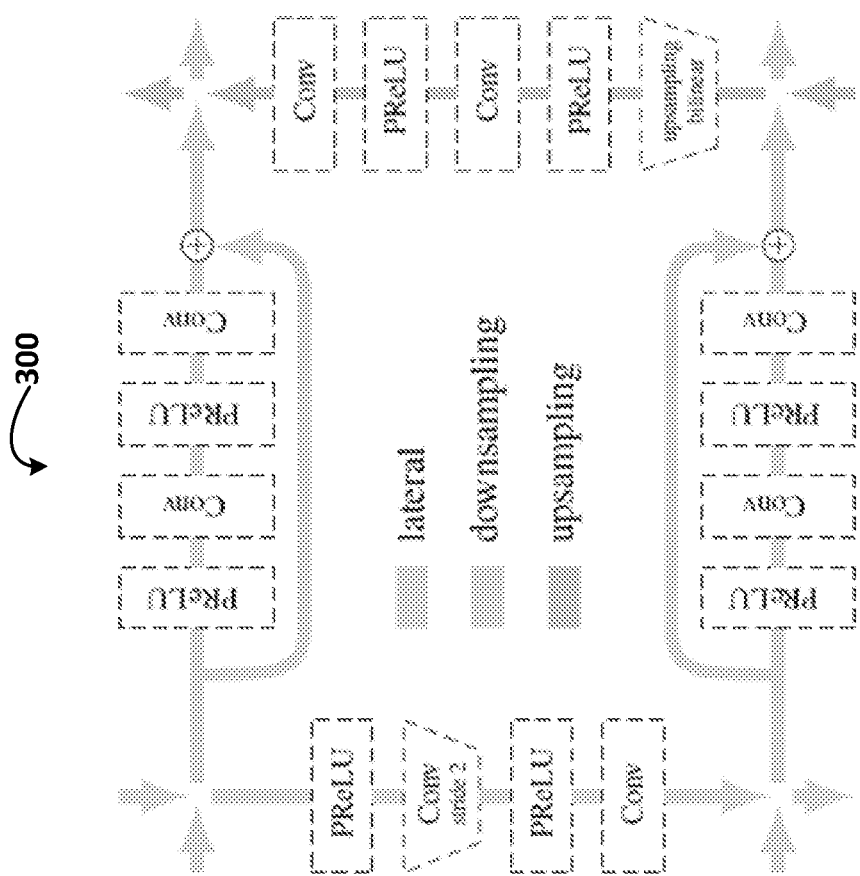
FIG. 3 depicts an example frame synthesis neural network of FIG. 2 according to various embodiments.

FIG. 3 depicts example building block of the FSN 300 of FIG. 2 according to various embodiments. In particular, the CAS 200 may follow recent findings in image enhancement tasks and may not use Batch Normalization [R15, R22, R30]. Furthermore, the FSN 300 may incorporate parametric rectified linear units ("PreLUs") for improved training and use bilinear upsampling to avoid checkerboard artifacts [R12, R33]. For example, as shown by FIG. 3, each of the rows and columns in the FSN 300 may include one or more convolution layers ("Conv") with one or more PReLU layers disposed therebetween. Note that the configuration of three streams, and thus, three scales, may lead to a relatively small receptive field of the network in general [R26]. However, it fits the problem to be solved relatively well since the pre-warping may already compensate for motion.

In some embodiments, various loss functions may be used that measure the difference between the interpolated frame $\hat{I}$ and its ground truth $I_{gt}$. For the color-based loss function, in accordance with the report that $l_2$ leads to blurry results [R11, R24, R27, R37, R40], a $l_1$-based loss function may be employed according to equation 1.

$$\mathcal{L}_1 = \|\hat{I} - I_{gt}\|_1 \qquad (1)$$

A feature-based loss function that measures perceptual difference may also be used [R05, R07, R17, R21, R38, R51]. In some cases, [R32] may be followed and the response of the relu4_4 layer from VGG-19 [R39] may be utilized to extract features φ and measure their difference according to equation 2.

$$\mathcal{L}_F = \|\varnothing(\hat{I}) - (I_{gt})\|_2^2 \qquad (2)$$

Another alternative that may be adopted measures difference between Laplacian pyramids [R03]. This multi-scale loss separates local and global features, thus potentially providing a better loss function for synthesis tasks. By denoting the i-th layer of a Laplacian pyramid representation of an image I as $L^i(I)$, the loss may be defined according to equation 3.

$$\mathcal{L}_{Lap} = \Sigma_{i=1}^{5} 2^{i-1} \|L^i(\hat{I}) - L^i(I_{gt})\|_1 \quad (3)$$

This loss function takes the difference between two Laplacian pyramid representations with five layers. Additionally, the contributions from the deeper levels may be scaled in order to partially account for their reduced spatial support. Briefly, the feature loss tends to produce visually more pleasing results while the Laplacian and the $l_1$-based color loss produce better quantitative results. How these different loss functions affect the interpolation results is discussed in more detail at Section 4 infra.

The subsystems 205, 210, 215, and 300 of the CAS 200 may be implemented as software components (e.g., software engines, software agents, artificial intelligence (AI) agents, modules, objects, or other like logical units), as individual hardware elements, or a combination thereof. In an example software-based implementation, the subsystems of the CAS 200 may be developed using a suitable programming language, development tools/environments, etc., which are executed by one or more processors of one or more computing systems (see e.g., processor circuitry 1202 of FIG. 12). In this example, program code of the subsystems 205, 210, 215, and 300 of the CAS 200 may be executed by a single processor or by individual processing devices. In an example hardware-based implementation, each subsystem 205, 210, 215, and 300 of the CAS 200 is implemented in a respective AI accelerating co-processor(s), AI GPUs, tensor processing units (TPUs), or hardware accelerators (e.g., FPGAs, ASICs, DSPs, SoCs, etc.) that are configured with appropriate logic blocks, bit stream(s), etc. to perform their respective functions.

In embodiments, a computer device or system (e.g., computer systems 1101 of FIG. 11 and/or computer system 1200 of FIG. 12) may include and/or have access to one or more computer-readable media having instructions stored thereon, that, when executed, cause the computer device to perform some or all of the operations of the Context-Aware Synthesizer (CAS) of FIG. 2. In other embodiments, a special-purpose processor may be configured to operate some or all of the operations of the CAS of FIG. 2. In some embodiments, any number of general purpose processors may be transformed into a special purpose processor to perform any of operations of the CAS responsive to accessing instructions stored in an electronic memory or computer-readable media.

3.2. Training

In various embodiments, the frame synthesis neural network may be trained on examples of size 256×256 using AdaMax with $\beta_1=0.9$, $\beta_2=0.999$, a learning rate of 0.001, and a mini-batch size of 8 samples [R19]. In some implementations, 50,000 training examples may be collected and the neural network may be trained on these for 50 epochs.

In embodiments, the training samples may be collected from videos by splitting each video into sets of three frames, such that the center frame in each triplet serves as the ground truth. Patches with a size of 300×300 may be extracted from these frame triplets, allowing for patches with useful information to be selected [R02]. In particular, patches may be selected that contain sufficiently large motion as well as high-frequency details. To determine the former, the optical flow between the first and the last patch in each triplet may be estimated using an optical flow algorithm, such as the DIS algorithm [R20]. In some implementations, the methodology of [R32] may be used to select raw videos and extract 50,000 samples with a resolution of 300×300 pixels.

While the raw samples in the training dataset have a resolution of 300×300 pixels, in some implementations, only patches with a size of 256×256 may be used during training. This allows for augmentation of the training data on the fly by choosing a different randomly cropped patch from a training sample each time it is being used. In order to eliminate potential priors, each patch may be randomly flipped vertically or horizontally and the temporal order may be randomly swapped.

3.3. Example Implementation

An example implementation of the embodiments herein has been developed using PyTorch, which is an open-source machine learning library for the Python programming language based on the Torch library and scientific computing framework. However, other programming languages, libraries, application programming interfaces, etc. may be used in other implementations. In an example implementation of the PWC-Net optical flow algorithm [R41], the necessary cost volume layer may be realized using Compute Unified Device Architecture (CUDA) and a grid sampler may be utilized from cuDNN in order to perform the involved warping [R06]. The CUDA layer may be developed using the Nvidia® CUDA® Toolkit. Wherever available, optimized cuDNN layers were utilized to implement the synthesis network [R06]. In this example implementation, the pre-warping algorithm was implemented using CUDA and atomic operations were leveraged to efficiently deal with race conditions. Fully training the synthesis network using a Nvidia® Titan X® (Pascal) takes about two days. On this graphics card, it takes 0.69 seconds to interpolate a 1920×1080 frame and 0.36 seconds to interpolate a 1280×720 frame. This includes all individual steps, the bidirectional optical flow estimation, the context extraction, the pre-warping, and the guided synthesis.

Instance normalization was found to improve the interpolation quality [R43]. In particular, the two input frames may be jointly normalized and the normalization may be reversed on the resulting output from the synthesis network. Similarly, the extracted context information may be jointly normalized, but the extracted content does not need to be reversed afterwards. Instance normalization may remove instance-specific contrast information, which may remove one possible type of variation in the input. Additionally, instance normalization may ensure that the color space and the context space have a similar range, which may help to train the synthesis network.

4. EXPERIMENTS

The embodiments herein were evaluated by quantitatively and qualitatively comparing example implementations with several baselines as well as representative conventional video frame interpolation methods.

As the interpolation category of the Middlebury optical flow benchmark is typically used for assessing frame interpolation methods [R01, R29, R31, R32], the embodiments were compared with the methods that perform best on this interpolation benchmark and that are publicly available. In particular, MDP-Flow2 [R48] was selected as a classic optical flow method, as it ranks the first among all the published methods on the Middlebury benchmark. Deep-Flow2 [R45] was also selected as a representative deep learning-based optical flow algorithm for the experiments.

For these optical flow algorithms, the frame interpolation algorithm from [R01] was used to produce interpolation results. The example embodiments were also compared to the recent SepConv [R32], which is based on adaptive separable convolutions. The phase-based interpolation from [R29] was also selected. In ablation experiments, several variations of the example embodiments, for example, were compared with a version that does not use contextual information.

4.1. Ablation Experiments

First, the different loss functions for training the FSN 300 was evaluated. Example design choices are discussed and compared with the example embodiments to several of its baseline versions.

The ablation experiments were conducted quantitatively and use the examples from the Middlebury optical flow benchmark that have publicly available ground truth interpolation results [R01]. There are twelve such examples, which were either obtained in a lab environment with controlled lighting, synthetically rendered, or acquired by filming real-world scenes. Each category, including four examples, were assessed separately and PSNR as well as SSIM were measured [R44].

Table 1 shows results of using various loss functions. Three different loss functions were considered to train the frame synthesis neural network, as detailed in Section 3.1. Whereas the $l_1$ color loss and the Laplacian loss aim to minimize the color difference, the feature loss focuses on perceptual difference. For simplicity, the model that has been trained with the color loss may be referred to as "$\mathcal{L}_1$" and the model trained with the Laplacian loss may be referred to as "$\mathcal{L}_{Lap}$". Following [R32], the model was not directly trained with the feature loss. Instead, the model was first trained with the Laplacian loss and then refined with the feature loss. The feature loss model may be referred to as "$\mathcal{L}_F$".

Figure 4:
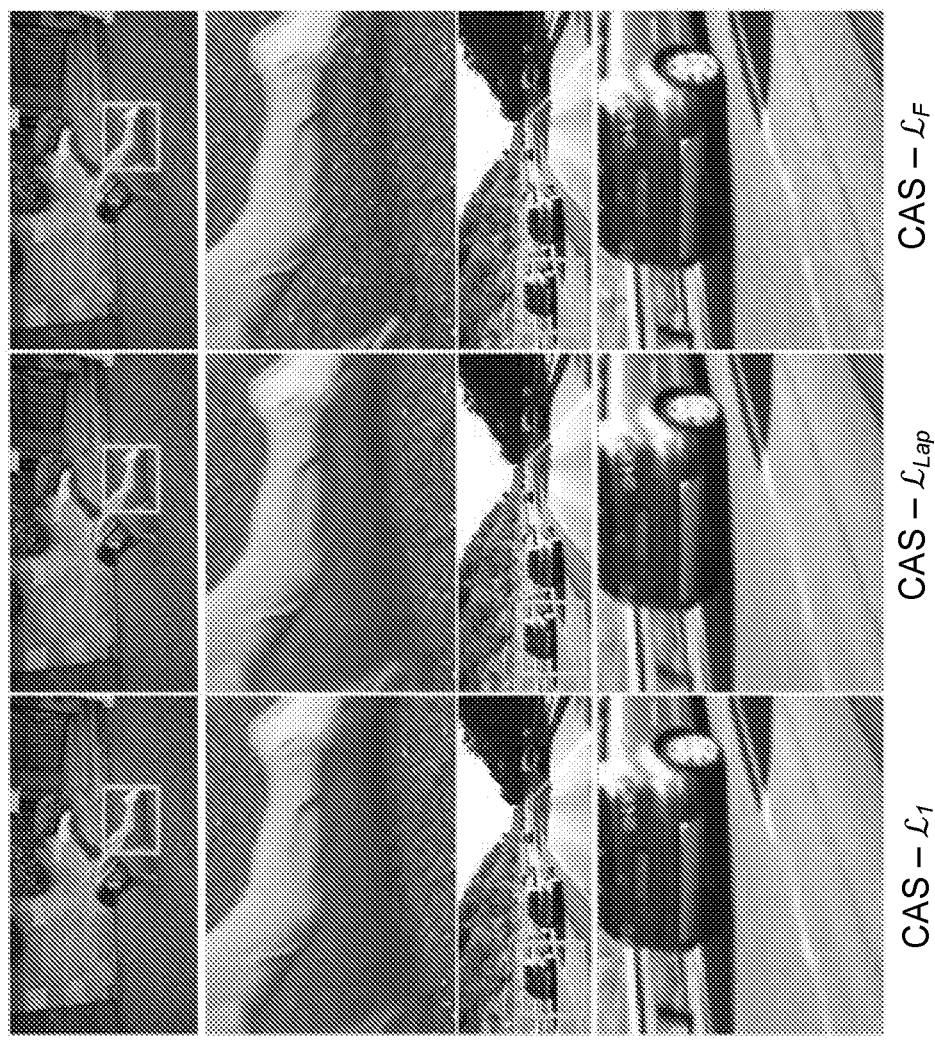
FIG. 4 depicts an example of using different loss functions according to various embodiments.

As reported in Table 1, the Laplacian loss $\mathcal{L}_{Lap}$ and the color loss $\mathcal{L}_1$, especially the former, outperform the feature loss $\mathcal{L}_F$ as well as the conventional methods quantitatively. This is because these losses functions aim to minimize the color difference. On the other hand, feature loss tends to produce visually more pleasant results, as shown in the user study in Section 4.3 and FIG. 4. FIG. 4 depicts example results where different loss functions were used.

TABLE 1

Evaluation of the loss functions

|  | AVERAGE | | LABORATORY | | SYNTHETIC | | REAL WORLD | |
| --- | --- | --- | --- | --- | --- | --- | --- | --- |
|  | PSNR | SSIM | PSNR | SSIM | PSNR | SSIM | PSNR | SSIM |
| CAS-$\mathcal{L}_{Lap}$ | 37.01 | 0.965 | 40.34 | 0.974 | 38.89 | 0.981 | 31.79 | 0.939 |
| CAS-$\mathcal{L}_1$ | 36.80 | 0.964 | 40.17 | 0.973 | 38.50 | 0.980 | 31.74 | 0.939 |
| CAS-$\mathcal{L}_F$ | 36.01 | 0.959 | 39.41 | 0.970 | 37.17 | 0.975 | 31.46 | 0.933 |
| SepConv-$\mathcal{L}_i$ | 35.82 | 0.960 | 40.22 | 0.974 | 36.78 | 0.974 | 30.47 | 0.932 |
| SepConv-$\mathcal{L}_F$ | 35.13 | 0.955 | 39.78 | 0.971 | 35.58 | 0.967 | 30.02 | 0.927 |
| MDP-Flow2 | 34.91 | 0.954 | 38.71 | 0.970 | 35.07 | 0.959 | 30.97 | 0.934 |
| DeepFlow2 | 34.44 | 0.952 | 38.63 | 0.969 | 34.63 | 0.956 | 30.07 | 0.931 |
| Meyer et al. | 31.00 | 0.885 | 34.54 | 0.918 | 27.88 | 0.813 | 30.58 | 0.925 |

Results of frame synthesis network vs pixel-wise blending is shown by table 2. In table 2, the term "net." may refer to the frame synthesis neural network of the embodiments discussed herein. To examine the effectiveness of the frame synthesis neural network, the frame synthesis neural network was compared to a blending baseline that employs the off-the-shelf warping algorithm to warp the input frames and then blends them together. The same bidirectional optical flow used in the neural network approach is used in this baseline. As a reference, algorithms from the Middlebury benchmark were compared that only use the forward flow for warping. As shown by table 2, the neural network approach shows a clear advantage over the blending approach. This can be attributed to the capability of our neural network in tolerating inaccuracies in optical flow estimation.

TABLE 2

Frame synthesis network vs pixel-wise blending

|  | AVERAGE | | LABORATORY | | SYNTHETIC | | REAL WORLD | |
| --- | --- | --- | --- | --- | --- | --- | --- | --- |
|  | PSNR | SSIM | PSNR | SSIM | PSNR | SSIM | PSNR | SSIM |
| net. w/context | 37.01 | 0.965 | 40.34 | 0.974 | 38.89 | 0.981 | 31.79 | 0.939 |
| net. w/o context | 35.53 | 0.959 | 39.23 | 0.970 | 35.69 | 0.967 | 31.68 | 0.939 |
| bidirect. blending | 34.80 | 0.953 | 38.54 | 0.969 | 34.27 | 0.953 | 31.59 | 0.938 |
| forward blending | 34.09 | 0.950 | 38.21 | 0.968 | 33.38 | 0.950 | 30.70 | 0.933 |

Table 3 shows results of contextual information evaluation. To understand the impact of the contextual information on the neural network, a synthesis network was trained that only received two pre-warped frames as input. As shown by table 3, the contextual information significantly helps the frame synthesis network to produce high-quality results.

TABLE 3

Effect of contextual information

|  | AVERAGE | | LABORATORY | | SYNTHETIC | | REAL WORLD | |
| --- | --- | --- | --- | --- | --- | --- | --- | --- |
|  | PSNR | SSIM | PSNR | SSIM | PSNR | SSIM | PSNR | SSIM |
| ResNet-18-conv1 | 37.01 | 0.965 | 40.34 | 0.974 | 38.89 | 0.981 | 31.79 | 0.939 |
| VGG-19-conv1_2 | 36.87 | 0.964 | 40.27 | 0.973 | 38.53 | 0.980 | 31.81 | 0.940 |
| VGG-19-conv1_1 | 36.76 | 0.964 | 40.11 | 0.973 | 38.37 | 0.979 | 31.80 | 0.940 |
| no context | 35.53 | 0.959 | 39.23 | 0.970 | 35.69 | 0.967 | 31.68 | 0.939 |

The embodiments use the conv1 layer of Resnet-18 to extract per-pixel contextual information. Other options were also tested, such as using layers conv1_1 and conv1_2 of VGG-19 [R39]. As reported in Table 3, while the conv1 layer of ResNet-18 overall works better, the difference among different ways to extract contextual information is insignificant. They all significantly outperform the baseline network without contextual information.

Table 4 shows results of an optical flow evaluation. To evaluate the selection of the optical flow algorithm on the embodiments, SPyNet [R36] was used as an alternative to the PWC-Net [R41] used in various embodiments. In optical flow benchmarks, SPyNet performs less well than PWCNet and as shown by table 4, this decreased accuracy also affects the synthesis results. Furthermore, training a synthesis network to directly operate on the input frames, without any pre-warping, significantly worsens the synthesis quality. This shows that it is very helpful to use motion compensation to provide a good initialization for frame interpolation. In fact, even using H.264 motion vectors is already beneficial. This is remarkable, considering that these motion vectors are only available per block.

TABLE 4

Effect of contextual information

|  | AVERAGE | | LABORATORY | | SYNTHETIC | | REAL WORLD | |
| --- | --- | --- | --- | --- | --- | --- | --- | --- |
|  | PSNR | SSIM | PSNR | SSIM | PSNR | SSIM | PSNR | SSIM |
| flow of PWC-Net | 37.01 | 0.965 | 40.34 | 0.974 | 38.89 | 0.981 | 31.79 | 0.939 |
| flow of SPyNet | 35.86 | 0.960 | 40.14 | 0.973 | 36.87 | 0.971 | 30.58 | 0.935 |
| H.264 motion vec. | 35.52 | 0.957 | 39.67 | 0.971 | 36.83 | 0.975 | 30.07 | 0.927 |
| no flow/warping | 35.07 | 0.956 | 38.93 | 0.966 | 35.98 | 0.966 | 30.30 | 0.935 |

4.2. Quantitative Evaluation

A quantitative comparison was performed with the conventional frame interpolation algorithms on the testing component of the Middlebury benchmark whose ground truth is not public [R01]. As reported by table 5, our method establishes a new conventional and improves the previously best performing method by a notable margin. Furthermore, according to the feedback from the Middlebury benchmark organizer, our interpolation results are ranked 1 among all the over 100 algorithms listed in the benchmark website.

TABLE 5

Evaluation on the Middlebury benchmark. disc.: regions with discontinuous motion. unt.: textureless regions

|  | all | disc | unt | all | disc | unt | all | disc | unt |
|---|---|---|---|---|---|---|---|---|---|
|  | AVERAGE | | | MEQUON | | | SCHEFFERA | | |
| CAS-$\mathcal{L}_{Lap}$ | 5.28 | 8.00 | 2.19 | 2.24 | 3.72 | 1.04 | 2.96 | 4.16 | 1.35 |
| SepConv-$\mathcal{L}_1$ | 5.61 | 8.74 | 2.33 | 2.52 | 4.83 | 1.11 | 3.56 | 5.04 | 1.90 |
| SepConv-$\mathcal{L}_F$ | 5.81 | 9.04 | 2.40 | 2.60 | 5.00 | 1.19 | 3.87 | 5.50 | 2.07 |
| MDP-Flow2 | 5.83 | 9.69 | 2.15 | 2.89 | 5.38 | 1.19 | 3.47 | 5.07 | 1.26 |
| DeepFlow2 | 6.02 | 9.94 | 2.06 | 2.99 | 5.65 | 1.22 | 3.88 | 5.79 | 1.48 |
|  | URBAN | | | TEDDY | | | BACKYARD | | |
| CAS-$\mathcal{L}_{Lap}$ | 4.32 | 3.42 | 3.18 | 4.21 | 5.46 | 3.00 | 9.6 | 11.9 | 3.46 |
| SepConv-$\mathcal{L}_1$ | 4.17 | 4.15 | 2.86 | 5.41 | 6.81 | 3.88 | 10.2 | 12.8 | 3.37 |
| SepConv-$\mathcal{L}_F$ | 4.38 | 4.29 | 2.73 | 5.78 | 7.16 | 3.94 | 10.1 | 12.7 | 3.39 |
| MDP-Flow2 | 5.20 | 7.48 | 3.14 | 5.20 | 7.48 | 3.14 | 10.2 | 12.8 | 3.61 |
| DeepFlow2 | 3.62 | 6.03 | 1.34 | 5.38 | 7.44 | 3.22 | 11.0 | 13.8 | 3.67 |
|  | BASKETBALL | | | DUMPTRUCK | | | EVERGREEN | | |
| CAS-$\mathcal{L}_{Lap}$ | 5.22 | 9.8 | 2.22 | 7.02 | 15.4 | 1.58 | 6.66 | 10.2 | 1.69 |
| SepConv-$\mathcal{L}_1$ | 5.47 | 10.4 | 2.21 | 6.88 | 15.6 | 1.72 | 6.63 | 10.3 | 1.62 |
| SepConv-$\mathcal{L}_F$ | 5.98 | 11.4 | 2.42 | 6.85 | 15.5 | 1.78 | 6.90 | 10.8 | 1.65 |
| MDP-Flow2 | 6.13 | 11.8 | 2.31 | 7.36 | 16.8 | 1.49 | 7.75 | 12.1 | 1.69 |
| DeepFlow2 | 5.83 | 11.2 | 2.25 | 7.60 | 17.4 | 1.50 | 7.82 | 12.2 | 1.77 |

4.3. Visual Comparison

Figure 5:
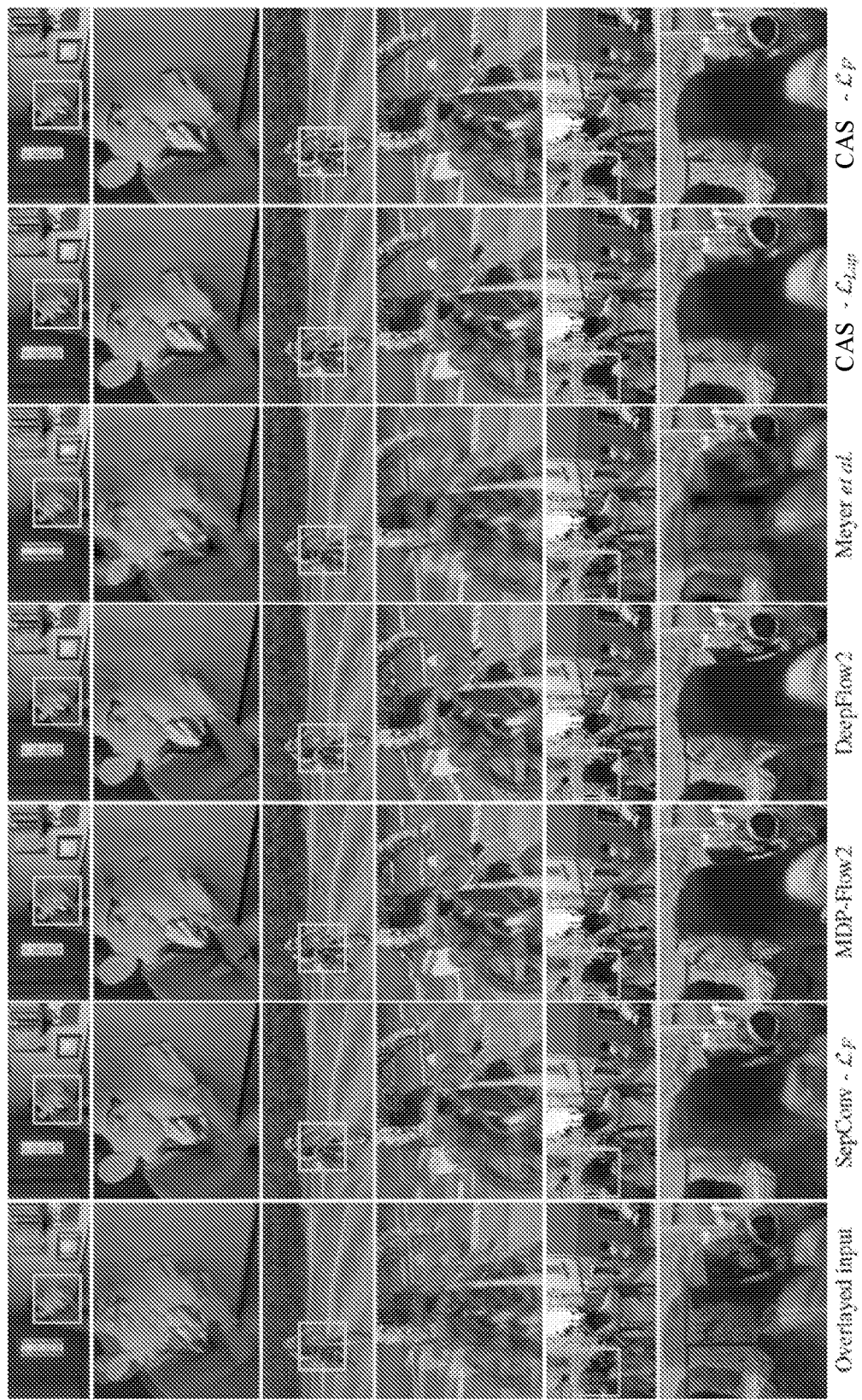
FIG. 5 depicts a visual comparison among frame interpolation methods according to various embodiments.

A comparison of the example embodiments with conventional video frame interpolation methods is shown by FIG. 5. FIG. 5 depicts a visual comparison among frame interpolation methods. These examples are subject to significant motion and occlusion. In general, the embodiments are capable of handling these challenging scenarios, with the $\mathcal{L}_F$ loss trained synthesis network retaining more high-frequency details. In comparison, SepConv-$\mathcal{L}_F$ fails to compensate for the large motion and is limited by the size of its adaptive kernels. The optical flow based methods MDP-Flow2 and DeepFlow2 handle the large motion better than SepConv-$\mathcal{L}_F$ but introduce artifacts due to their limited synthesis capabilities. Lastly, the phase-based approach from Meyer et al. also has difficulty in handling large motion. Please refer to the supplemental video to see these examples in motion.

Figure 6:
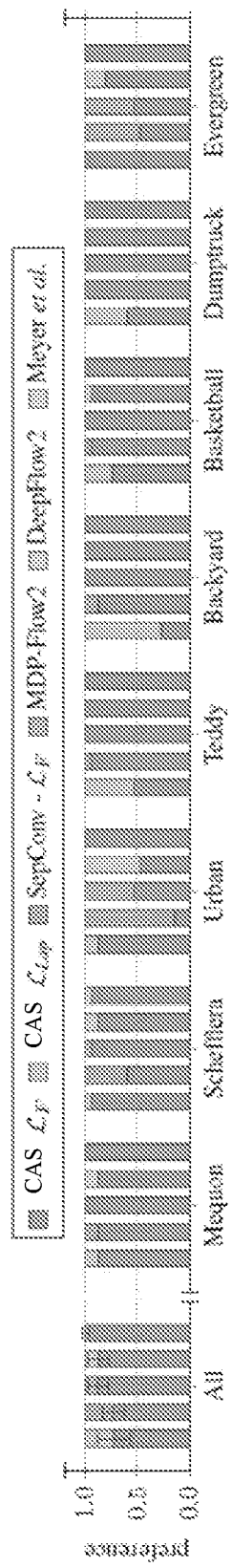
FIG. 6 shows results from a user study according to various embodiments.

A user study was also conducted to further compare the embodiments with the other frame interpolation methods on all the eight examples from the Middlebury benchmark. In particular, the results of the embodiments when using $\mathcal{L}_F$ loss was compared with five conventional video frame interpolation methods. 15 computer science students were recruited as participants for the user study, which involved providing the students with an interface that allowed them to easily switch between two images. For each pair, the students were asked to select the better one and let each participant perform 40 such comparisons, with one comparing results of the embodiments to each of the five competing methods for all 8 examples. FIG. 6 shows results of the user study, where the error bars denote the standard deviation.

Figure 7:
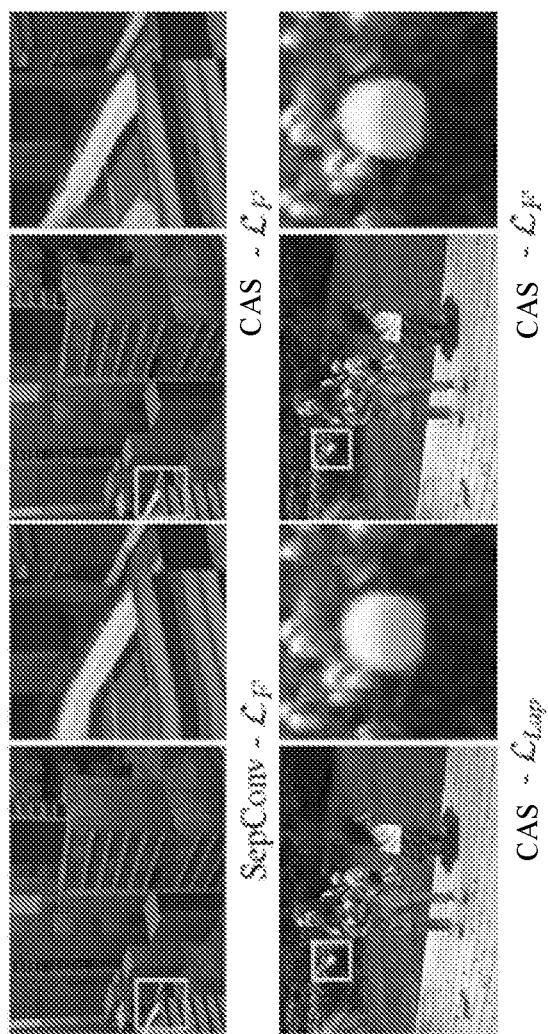
FIG. 7 shows results from the user study of FIG. 6 where embodiments were not preferred.

Overall, the participants preferred the approach of the embodiments that utilizes $\mathcal{L}_F$ loss. The two scenarios where the preference were not in favor of the embodiments, Urban with SepConv-$\mathcal{L}_F$ and Backward with embodiments with $\mathcal{L}_{Lap}$ loss. These scenarios are shown by FIG. 7. In the Urban example, SepConv-$\mathcal{L}_F$ has fewer artifacts at the boundary. In the Backyard example, $\mathcal{L}_F$ loss introduced chromatic artifacts around the orange ball that is subject to large motion. Nevertheless, this study shows that overall our method with $\mathcal{L}_F$ loss achieves better perceptual quality although $\mathcal{L}_{Lap}$ loss performs better quantitatively.

4.4. Discussion

Figure 8:
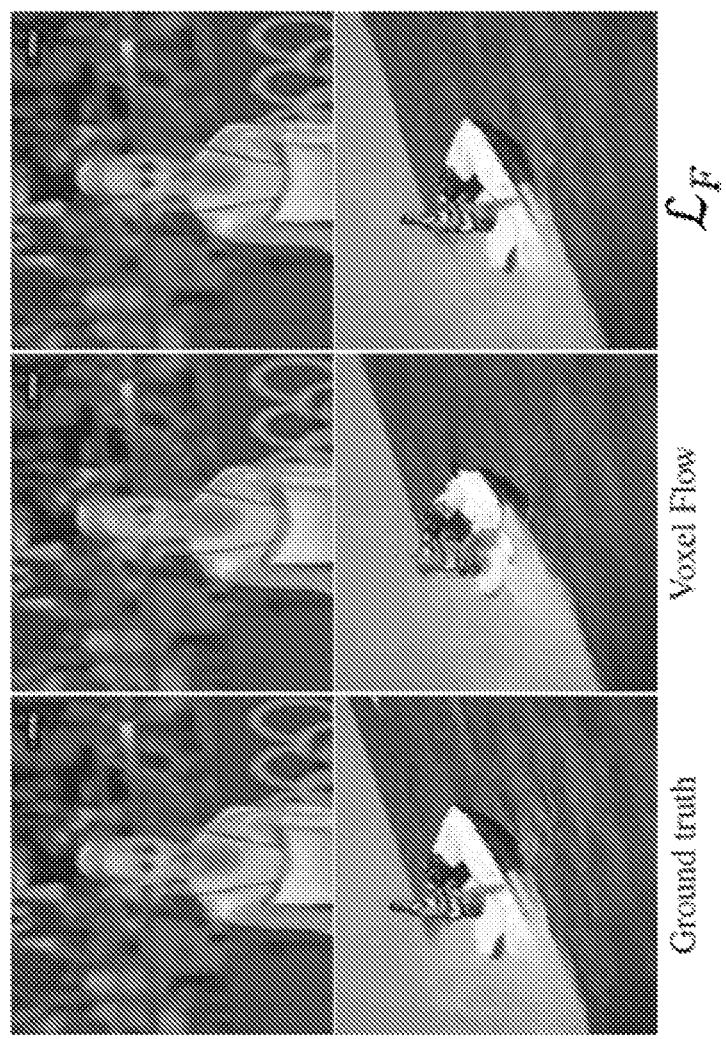
FIG. 8 shows results from a comparison of various embodiments with results of a recent voxel flow method.

FIG. 8 shows a comparison of frames using various embodiments with frames using a recent voxel flow method. The recent voxel flow-based video frame interpolation method estimates voxel flow to sample a $2^3$ spatial-temporal neighborhood to generate the interpolation results [R23]. Since it only samples a $2^3$ space-time volume, it is still fairly limited in handling inaccuracies in motion estimation. As shown by FIG. 8, the embodiments are able to produce better results due to its flexibility.

Figure 9:
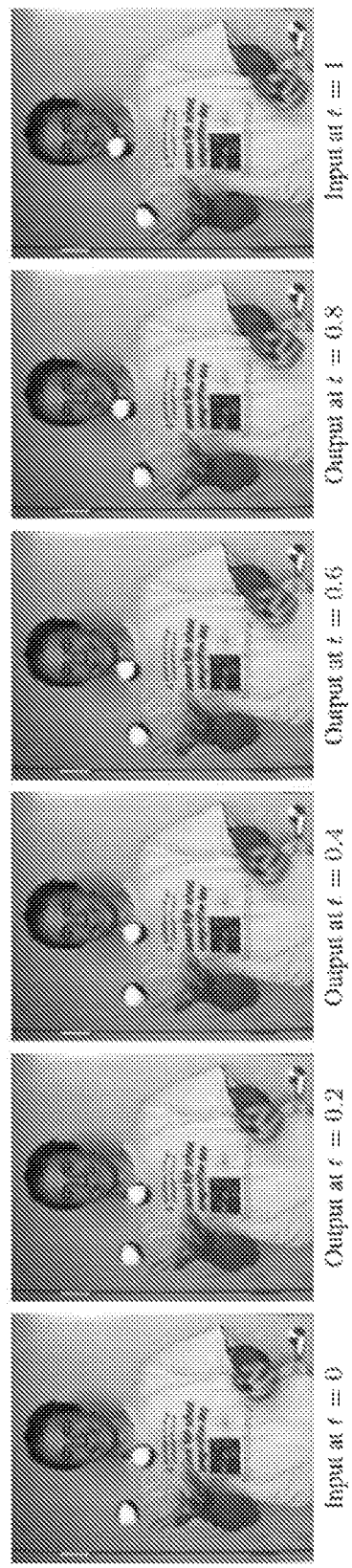
FIG. 9 shows a sequence of interpolated frames using a feature loss model trained approach according to various embodiments.

FIG. 9 shows a sequence of interpolated frames using a feature loss model trained approach according to various embodiments. Since motion compensation is performed before synthesizing the output frame, embodiments are able to interpolate a frame at an arbitrary temporal position $t \in [0, 1]$, as shown in FIG. 9. Other efforts that use convolutional neural networks for video frame interpolation either had to retrain their synthesis network for a specific t or continue the interpolation recursively in order to achieve similar results [R31, R32]. Furthermore, the embodiments are not limited to video frame interpolation. In fact, various embodiments can also be utilized to synthesize between stereo frames.

Figure 10:
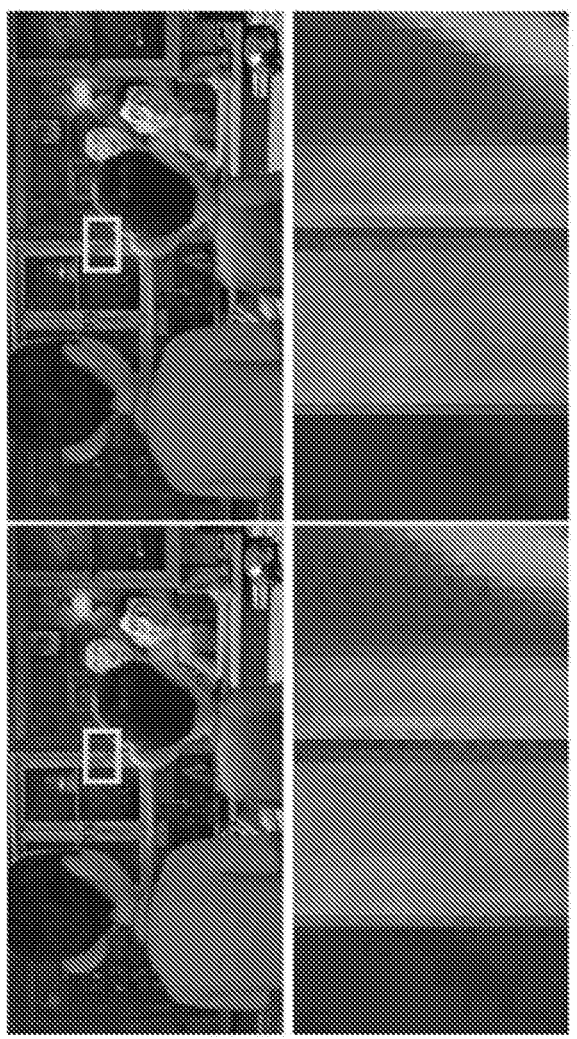
FIG. 10 shows frames where a checkerboard artifacts prevention mechanism was used in accordance with various embodiments.

FIG. 10 shows frames where a checkerboard artifacts prevention mechanism was used in accordance with various embodiments. When using $\mathcal{L}_F$ loss, checkerboard artifacts can occur if the architecture of the utilized neural network is not chosen well [R33]. To avoid such artifacts, a modified version of the GridNet architecture of the frame synthesis network may be used and bilinear upsampling may be utilized instead of transposed convolutions. As shown by FIG. 10, this decision may successfully prevent checkerboard artifacts.

As discussed in Section 4.1, pre-warping input frames and context maps using optical flow may be used to produce high-quality frame interpolation results. While PWC-Net provides a good initialization for some embodiments, other embodiments may use other mechanisms for initialization.

5. SUMMARY

The present disclosure discusses various embodiments of context-aware synthesis for video frame interpolation. In various embodiments, a bidirectional flow may be used in combination with a flexible frame synthesis neural network to handle relatively challenging cases like occlusions and accommodate inaccuracies in motion estimation. In various embodiments, contextual information may be used to enable frame synthesis neural network to perform informative interpolation. In various embodiments, optical flow may be used to provide good initialization for interpolation. The present disclosure also demonstrate various experiments where the various embodiments herein were used to produce high-quality video frame interpolation results and outperform previous and/or current video frame interpolation techniques.

6. EXAMPLE SYSTEM OVERVIEW

Figure 11:
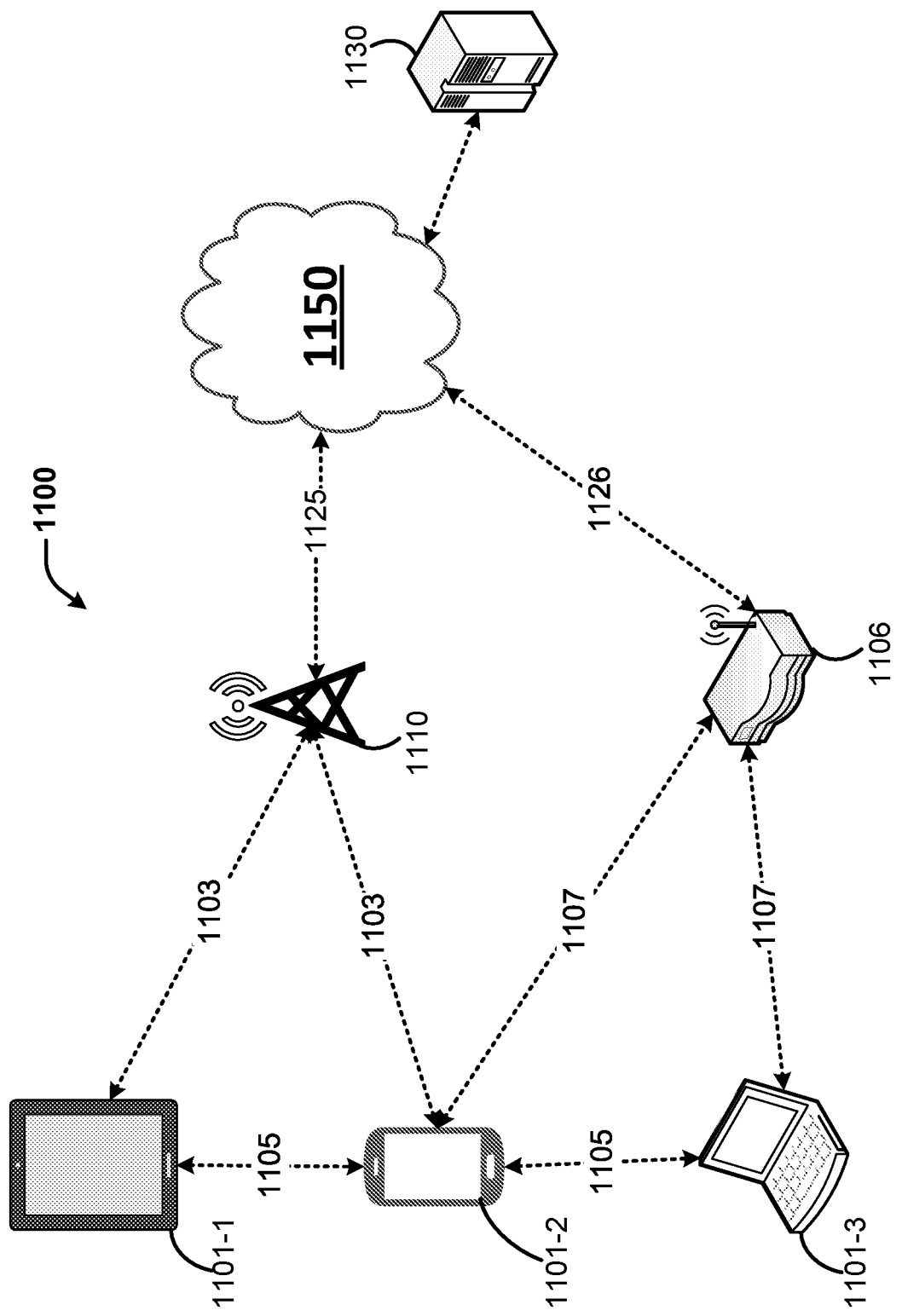
FIG. 11 depicts an example system in accordance with various embodiments.

FIG. 11 illustrates a system 1100 in which various embodiments may be practiced. System 1100 includes computer systems 1101-1, 1101-2, and 1101-3 (collectively referred to as "computer system 1101" or "computer systems 1101"), an access node (AN) 1110, an access point (AP) 1106, network 1150, and a service provider platform (SPP) 1130.

The system 1100 is shown to include a computer systems 1101, which may include one or more processors (having one or more processor cores and optionally, one or more hardware accelerators, or the like), memory devices, communication devices, etc. that may be configured to carry out various functions according to the various embodiments discussed herein. In this example, the computer systems 1101-1 and 1101-2 are illustrated as a tablet computer and a smartphone, respectively (e.g., handheld touchscreen mobile computing devices connectable to one or more cellular networks), and computer system 1101-3 is illustrated as a laptop computer. However, the computer systems 1101 may also comprise any mobile or non-mobile computing device.

The computer systems 1101 may obtain and/or process data from various sources, and the processed data may be displayed by respective display devices employed by each computer system 1101 according to the various embodiments discussed herein. The computer systems 1101 may obtain data (e.g., data packets and/or data streams) from the SPP 1130 via the network 1150, AN 1110, and AP 1106, from network 1150 and/or network infrastructure (e.g., core network elements of a cellular communications network, servers of a cloud computing service, etc.), navigation signaling/data from on-board navigations systems (e.g., global navigation satellite system (GNSS), global positioning system (GPS), etc.), and/or the like. In embodiments, the computer systems 1101 may also include, or operate in conjunction with communications circuitry, and/or input/output (I/O) interface circuitry in order to obtain the data from various sources.

In embodiments, the communications circuitry of the computer systems 1101 may enable the computer systems 1101 to directly exchange data via links 1105. Links 1105 may be a short range radio link for direct intra-mobile device communications, which may operate in accordance with a suitable wireless communication protocol, such as Zigbee®, Bluetooth® or Bluetooth Low Energy (BLE), IEEE 802.15.4 (6LoWPAN), WiFi-direct, ANT or ANT+; 3GPP device-to-device (D2D) or Proximity Services (ProSe); Z-Wave (also known as "Zig-Wave"); Linear; SigFox; etc.

The UEs 1101-2 and 1101-3 are shown to be configured to access AP 1106 via respective connections 1107. The connections 1107 can comprise a local wireless connection, such as a connection consistent with any IEEE 802.11 protocol, wherein the AP 106 would comprise a wireless fidelity (WiFi®) router. The AP 106 may be connected to the network 1150 via connection 1126 without connecting to a core network of the wireless system. In some embodiments, the AP 1106 may be a gateway (GW) device that may include one or more processors, communications systems (e.g., including network interface controllers, one or more transmitters/receivers connected to one or more antennas, and the like), and computer-readable media. In such embodiments, the AP 1106 may be a wireless access point (WAP), a home/business server (with or without radio frequency (RF) communications circuitry), a router, a switch, a hub, a radio beacon, and/or any other like network device/element.

The AN 1110 may terminate an air interface of the links 1103. The AN 1110 may be network infrastructure or network equipment that provides the radio baseband functions for data and/or voice connectivity between a network and one or more users (e.g., computer systems 1101). For example, the computer systems 1101-1 and 1101-2 may be configured to communicate with the AN 1110 according to LTE, NR, or some other suitable cellular communications protocol. The AN 1110 may be a base station associated with a cellular network (e.g., an evolved NodeB (eNB) in an LTE network, a next generation NodeB (gNB) in a new radio access technology (NR) network, a WiMAX base station, etc.), an Road Side Unit (RSU), a remote radio head, a relay radio device, a smallcell base station (e.g., a femtocell, picocell, Home eNB (HeNB), and the like), or other like network element, and may provide a macrocell, or a femtocell or picocell (e.g., cells having smaller coverage areas, smaller user capacity, or higher bandwidth compared to macrocells). Although the term "access node" or "AN" may be used to refer to base stations, the terms "access node" or "AN" may be used interchangeably with the terms "access point" or "AP."

The AN 1110 may each include transmitter(s)/receiver(s) (or alternatively, transceiver(s)) connected to one or more antennas elements, one or more memory devices, one or more processors, one or more network interface controllers, and/or other like components. The transmitters/receivers may be configured to transmit/receive data signals to/from one or more computer systems 1101 via a link (e.g., links 1103). Furthermore, the network interface controllers may be configured to transmit/receive data to/from various network elements (e.g., one or more servers within a core network, network 1150, etc.) over another backhaul connection (e.g., link 1125).

In embodiments, each computer system 1101 may generate and transmit data to the AN 1110 over respective links 1103, and the AN 1110 may provide the data to the network 1150 over backhaul link 1125. Additionally, during operation of the computer systems 1101, the AN 1110 may obtain data intended for the computer systems 1101 from the network 1150 over link 1125, and may provide that data to the computer systems 1101 over respective links 1103.

The SPP 1130 may include one or more physical and/or virtualized systems for providing content and/or functionality (e.g., services) to one or more clients (e.g., computer systems 1101) over a network (e.g., network 1150). The physical and/or virtualized systems include one or more logically or physically connected servers and/or data storage devices distributed locally or across one or more geographic locations. The physical and/or virtualized systems may include one or more processors, one or more memory devices, one or more network interfaces, etc. The physical and/or virtualized systems may include an operating system (OS) that may provide executable program instructions for the general administration and operation of servers, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

Generally, the SPP 1130 is/are configured to use IP/network resources to provide web pages, forms, applications, data, services, and/or media content to computer systems 1101. As examples, the SPP 1130 may provide banking and/or financial services, social networking and/or microblogging services, internet forums, content (media) streaming services, e-commerce services, search engine services, cloud analytics services, immersive gaming experiences, on-demand database services, web-based customer relationship management (CRM) services, and/or other like services. In other examples, the SPP 1130 may represent an intranet, enterprise network, or some other like private network that is unavailable to the public. In some embodiments, the SPP 1130 may be associated with a mobile network operator (MNO), and in such embodiments, the SPP 1130 may be configured to support communication services such as Voice-over-Internet Protocol (VoIP) sessions, PTT sessions, group communication sessions, and the like for the computer systems 1101 via the network 1150.

In order to provide content and/or services to the computer systems 1101, the SPP 1130 may operate web servers and/or applications servers. The web server(s) serve static content from a file system of the web server(s), and may generate and serve dynamic content (e.g., server-side programming, database connections, dynamic generation of web documents) using an appropriate plug-in (e.g., a ASP-.NET plug-in). The application server(s) implement an application platform, which is a framework that provides for the development and execution of server-side applications as part of an application hosting service. The application platform enables the creation, management, and execution of one or more server-side applications developed by the SPP 1130 and/or third party application developers, which allow users and/or third party application developers to access the SPP 1130 via respective computer systems 1101. The computer systems 1101 may operate client applications to access the dynamic content, for example, by sending appropriate HTTP messages or the like, and in response, the server-side application(s) may dynamically generate and provide source code, scripts, etc., to the computer systems 1101 to be rendered within the client application. The computer systems 1101 communicate with SPP 1130, and vice versa, to obtain/serve content/services using, for example, Hypertext Transfer Protocol (HTTP) over Transmission Control Protocol (TCP)/Internet Protocol (IP), or one or more other common Internet protocols such as File Transfer Protocol (FTP); Session Initiation Protocol (SIP) with Session Description Protocol (SDP), Real-time Transport Protocol (RTP), or Real-time Streaming Protocol (RTSP); Real-Time Communication (RTC) and/or WebRTC; Secure Shell (SSH), Extensible Messaging and Presence Protocol (XMPP); WebSocket; and/or some other communication protocol, such as those discussed herein. The server-side applications may be developed with any suitable server-side programming languages or technologies, such as PHP; Java™ based technologies such as Java Servlets, JavaServer Pages (JSP), JavaServer Faces (JSF), etc.; ASP.NET; Ruby or Ruby on Rails; and/or any other like technology that renders HyperText Markup Language (HTML). The applications may be built using a platform-specific and/or proprietary development tool and/or programming languages.

In embodiments, the network 1150 may comprise computers, network connections among the computers, and software routines to enable communication between the computers over network connections. In this regard, the network 1150 may each comprise one or more network elements that may include one or more processors, communications systems (e.g., including network interface controllers, one or more transmitters/receivers connected to one or more antennas, etc.), and computer readable media. Examples of such network elements may include wireless access points (WAPs), a home/business server (with or without radio frequency (RF) communications circuitry), a router, a switch, a hub, a radio beacon, base stations, picocell or small cell base stations, and/or any other like network device. Connection to the network 1150 may be via a wired or a wireless connection using the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. More than one network may be involved in a communication session between the illustrated devices. Connection to the network 1150 may require that the computers execute software routines which enable, for example, the seven layers of the OSI model of computer networking or equivalent in a wireless (cellular) phone network.

Network 1150 may be used to enable relatively long-range communication. In such embodiments, network 1150 may represent the Internet, Transfer Control Protocol (TCP)/Internet Protocol (IP)-based network, one or more cellular networks, a local area network (LAN) or a wide area network (WAN), proprietary and/or enterprise networks, one or more cloud computing services, or combinations thereof. In such embodiments, the network 1150 may be associated with network operator who owns or controls equipment and other elements necessary to provide network-related services, such as one or more APs 1106 or ANs 1110, one or more servers for routing digital data or telephone calls (for example, a core network or backbone network), etc. Implementations, components, and protocols used to communicate via such services may be those known in the art and are omitted herein for the sake of brevity. In some embodiments, network 1150 may be used to enable relatively short-range communication, and may represent a short-range network, such as person-to-person (P2P) or personal area network (PAN) (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like), or could represent any other network or protocols as discussed herein.

Figure 12:
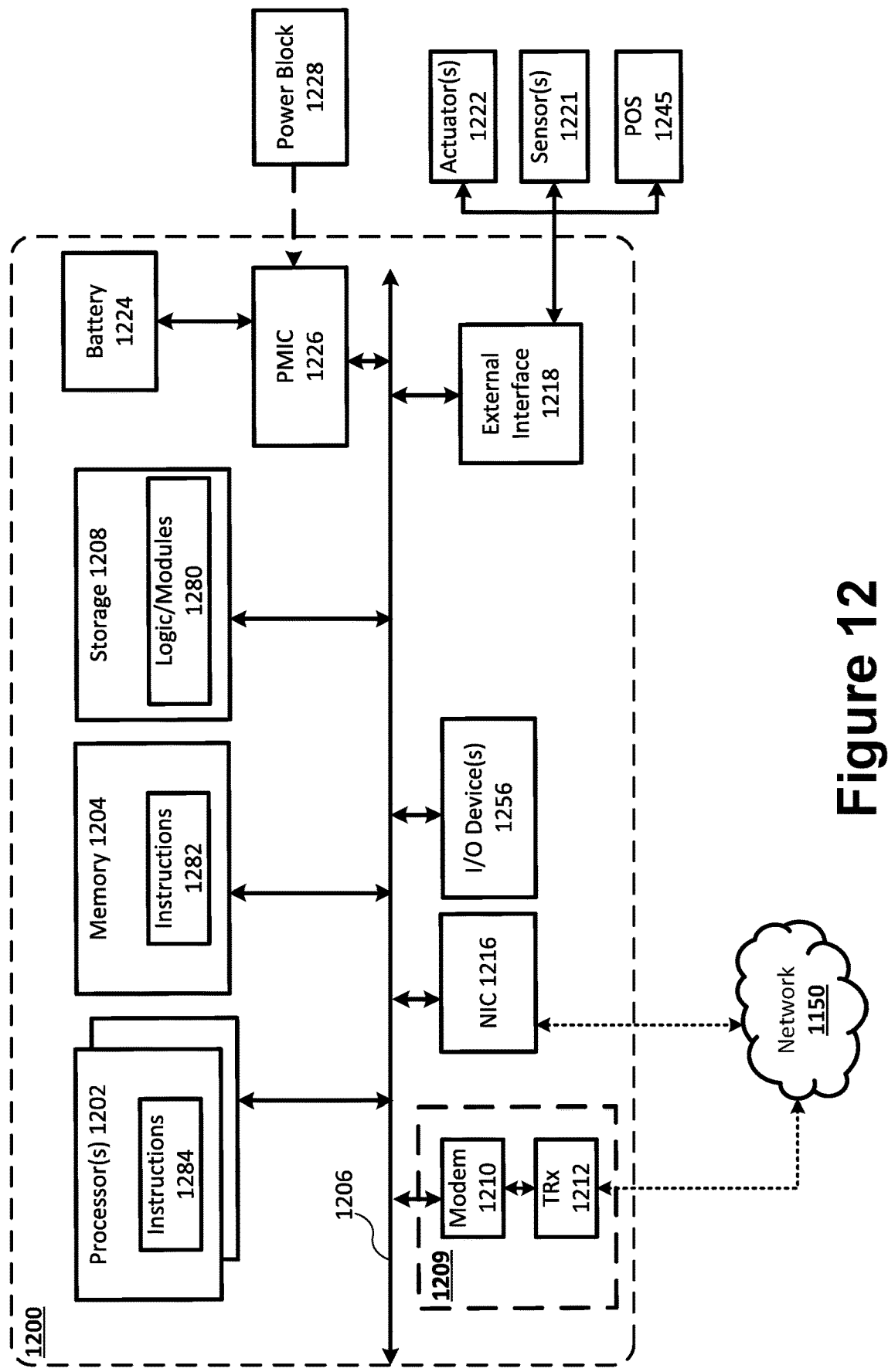
FIG. 12 depicts an example of a computer platform in accordance with various embodiments.

FIG. 12 illustrates an example implementation of a computing system 1200 (also referred to as "platform 1200," "device 1200," "appliance 1200," or the like) in accordance with various embodiments. The system 1200 may be suitable for use as any of the computer devices discussed herein, such as the computer systems 1101, server(s) of the SPP 1130, and/or some other computer system. The components of system 1200 may be implemented as an individual computer system, or as components otherwise incorporated within a chassis of a larger system. The components of system 1200 may be implemented as integrated circuits (ICs) or other discrete electronic devices, with the appropriate logic, software, firmware, or a combination thereof, adapted in the computer system 1200, or as components otherwise incorporated within a chassis of a larger system. The platform 1200 may be an embedded system or any other type of computer device discussed herein. In some embodiments, the platform 1200 may be a separate and dedicated and/or special-purpose computer device designed specifically to carry out the embodiments discussed herein. Additionally or alternatively, some of the components of system 1200 may be combined and implemented as a suitable System-on-Chip (SoC), System-in-Package (SiP), multichip package (MCP), or the like.

The system 1200 includes physical hardware devices and software components capable of providing and/or accessing content and/or services to/from remote systems (e.g., SPP 1130 of FIG. 11). The system 1200 can be implemented as any suitable computing system or other data processing apparatus usable to access and/or provide content/services from/to remote systems. As examples, the system 1200 may comprise desktop computers, a work stations, laptop computers, mobile cellular phones (e.g., "smartphones"), tablet computers, portable media players, wearable computing devices, server computer systems, an aggregation of computing resources (e.g., in a cloud-based environment), or some other computing devices capable of interfacing directly or indirectly with network 1150 or other network The platform 1200 may include processor circuitry 1202, which is configured to execute program code, and/or sequentially and automatically carry out a sequence of arithmetic or logical operations; record, store, and/or transfer digital data. The processor circuitry 1202 includes circuitry such as, but not limited to one or more processor cores and one or more of cache memory, low drop-out voltage regulators (LDOs), interrupt controllers, serial interfaces such as serial peripheral interface (SPI), inter-integrated circuit (VC) or universal programmable serial interface circuit, real time clock (RTC), timer-counters including interval and watchdog timers, general purpose input-output (I/O), memory card controllers, interconnect (IX) controllers and/or interfaces, universal serial bus (USB) interfaces, mobile industry processor interface (MIPI) interfaces, Joint Test Access Group (JTAG) test access ports, and the like. The processor circuitry 1202 may include on-chip memory circuitry or cache memory circuitry, which may include any suitable volatile and/or non-volatile memory, such as DRAM, SRAM, EPROM, EEPROM, Flash memory, solid-state memory, and/or any other type of memory device technology, such as those discussed herein. Individual processors (or individual processor cores) of the processor circuitry 1202 may be coupled with or may include memory/storage and may be configured to execute instructions stored in the memory/storage to enable various applications or operating systems to run on the system 1200. In these embodiments, the processors (or cores) of the processor circuitry 1202 are configured to operate application software (e.g., logic/modules 1280) to provide specific services to a user of the system 1200. In some embodiments, the processor circuitry 1202 may include special-purpose processor/controller to operate according to the various embodiments herein.

In various implementations, the processor(s) of processor circuitry 902 may include, for example, one or more processor cores (CPUs), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), SoCs and/or programmable SoCs, programmable logic devices (PLDs) such as complex PLDs (CPLDs) or high-capacity PLDs (HCPLDs), microprocessors or controllers, or any suitable combination thereof. As examples, the processor circuitry 1202 may include one or more Intel Pentium®, Intel® Core™ based processor(s), MCU-class processor(s), Xeon® processor(s); Advanced Micro Devices (AMD) Zen® Core Architecture processor(s), such as Ryzen® or Epyc® processor(s), Accelerated Processing Units (APUs), MxGPUs, or the like; A, S, W, and T series processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); Power Architecture processor(s) provided by the OpenPOWER® Foundation and/or IBM®, MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; the ThunderX2® provided by Cavium™, Inc.; GeForce®, Tegra®, Titan X® series graphics cards (GPUs) based on the Pascal microarchitecture, Tesla®, Shield®, and/or other like GPUs provided by Nvidia®; and/or the like. Other examples of the processor circuitry 1202 may be mentioned elsewhere in the present disclosure.

In some implementations, the processor(s) of processor circuitry 1202 may be, or may include, one or more media processors comprising microprocessor-based SoC(s), FPGA(s), or DSP(s) specifically designed to deal with digital streaming data in real-time, which may include encoder/decoder circuitry to compress/decompress (or encode and decode) Advanced Video Coding (AVC) (also known as H.264 and MPEG-4) digital data, High Efficiency Video Coding (HEVC) (also known as H.265 and MPEG-H part 2) digital data, and/or the like.

In some implementations, the processor circuitry 1202 may include one or more hardware accelerators. The hardware accelerators may be microprocessors, configurable hardware (e.g., FPGAs, programmable ASICs, programmable SoCs, DSPs, etc.), or some other suitable special-purpose processing device tailored to perform one or more specific tasks or workloads, for example, specific tasks or workloads of the subsystems of the CAS 200, which may be more efficient than using general-purpose processor cores. In some embodiments, the specific tasks or workloads may be offloaded from one or more processors of the processor circuitry 1202. In these implementations, the circuitry of processor circuitry 1202 may comprise logic blocks or logic fabric including and other interconnected resources that may be programmed to perform various functions, such as the procedures, methods, functions, etc. of the various embodiments discussed herein. Additionally, the processor circuitry 1202 may include memory cells (e.g., erasable programmable read-only memory (EPROM), electrically erasable programmable read-only memory (EEPROM), flash memory, static memory (e.g., SRAM, anti-fuses, etc.) used to store logic blocks, logic fabric, data, etc. in lookup-tables (LUTs) and the like.

In some implementations, the processor circuitry 1202 may include hardware elements specifically tailored for machine learning functionality, such as for operating the subsystems of the CAS 200 discussed previously with regard to FIG. 2. In these implementations, the processor circuitry 1202 may be, or may include, an AI engine chip that can run many different kinds of AI instruction sets once loaded with the appropriate weightings and training code. Additionally or alternatively, the processor circuitry 1202 may be, or may include, AI accelerator(s), which may be one or more of the aforementioned hardware accelerators designed for hardware acceleration of AI applications, such as one or more of the subsystems of CAS 200. As examples, these processor(s) or accelerators may be a cluster of artificial intelligence (AI) GPUs, tensor processing units (TPUs) developed by Google® Inc., Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 1202 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like.

In some implementations, the processor(s) of processor circuitry 1202 may be, or may include, one or more custom-designed silicon cores specifically designed to operate corresponding subsystems of the CAS 200. These cores may be designed as synthesizable cores comprising hardware description language logic (e.g., register transfer logic, verilog, Very High Speed Integrated Circuit hardware description language (VHDL), etc.); netlist cores comprising gate-level description of electronic components and connections and/or process-specific very-large-scale integration (VLSI) layout; and/or analog or digital logic in transistor-layout format. In these implementations, one or more of the subsystems of the CAS 200 may be operated, at least in part, on custom-designed silicon core(s). These "hardware-ized" subsystems may be integrated into a larger chipset but may be more efficient that using general purpose processor cores.

In some embodiments, the processor circuitry 1202 may include a sensor hub, which may act as a coprocessor by processing data obtained from the sensor circuitry 1221. The sensor hub may include circuitry configured to integrate data obtained from each of the sensor circuitry 1221 by performing arithmetical, logical, and input/output operations. In embodiments, the sensor hub may capable of timestamping obtained sensor data, providing sensor data to the processor circuitry 1202 in response to a query for such data, buffering sensor data, continuously streaming sensor data to the processor circuitry 1202 including independent streams for each sensor 1222, reporting sensor data based upon predefined thresholds or conditions/triggers, and/or other like data processing functions.

In any of the aforementioned embodiments, the processor circuitry 1202 may be implemented as a standalone system/device/package or as part of an existing system/device/package of the computer system 1101. The processor circuitry 1202 may be a part of an SoC in which the processor circuitry 1202 and other components discussed herein are formed into a single IC or a single package.

The memory circuitry 1204 may be circuitry configured to store data or logic for operating the platform 1200. memory circuitry 1204 comprises any number of memory devices arranged to provide primary storage from which the processor circuitry 1202 continuously reads instructions 1282 stored therein for execution. In some embodiments, the memory circuitry 1204 is on-die memory or registers associated with the processor circuitry 1202. As examples, the memory circuitry 1204 may include volatile memory such as random access memory (RAM), dynamic RAM (DRAM), synchronous DRAM (SDRAM), etc. The memory circuitry 1204 may also include nonvolatile memory (NVM) such as high-speed electrically erasable memory (commonly referred to as "flash memory"), phase change RAM (PRAM), resistive memory such as magnetoresistive random access memory (MRAM), etc. The memory circuitry 1204 may also comprise persistent storage devices, which may be temporal and/or persistent storage of any type, including, but not limited to, non-volatile memory, optical, magnetic, and/or solid state mass storage, and so forth. Where configurable hardware is/are used, the processor circuitry 1202 and memory circuitry 1204 may comprise logic blocks or logic fabric, memory cells, input/output (I/O) blocks, and other interconnected resources that may be programmed to perform various functions of the example embodiments discussed herein. The memory cells may be used to store data in LUTs that are used by the processor circuitry 1202 to implement various logic functions. The memory cells may include any combination of various levels of memory/storage including, but not limited to, EPROM, EEPROM, flash memory, SRAM, anti-fuses, etc.

Storage circuitry 1208 (with shared or respective controllers) is arranged to provide persistent storage of information such as data, applications, operating systems (OS), and so forth. As examples, the storage circuitry 908 may be implemented as hard disk drives (HDDs); a micro HDD; solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor circuitry 1202; resistance change memories; phase change memories; holographic memories; chemical memories; among others. As shown, the storage circuitry 1208 is included in the platform 1200; however, in other embodiments, storage circuitry 1208 may be implemented as one or more separate devices that are mounted in computer system 1101 separate from the other elements of platform 1200.

The storage circuitry 1208 is configured to store computational logic 1280 (or "modules 1280") in the form of software, firmware, microcode, or hardware-level instructions to implement the techniques described herein. The computational logic 1280 may be employed to store working copies and/or permanent copies of programming instructions, or data to create the programming instructions, for the operation of various components of system 1200 (e.g., drivers, libraries, application programming interfaces (APIs), etc.), an OS of system 1200, one or more applications, and/or for carrying out the embodiments discussed herein. The computational logic 1280 for carrying out operations of the present disclosure may be written in any combination of the programming languages discussed herein. As an example, the computational logic 1280 may include software modules, program code, etc. of the CAS discussed with regard to FIGS. 2-3. In addition, the computational logic 1280 may comprise image data to be interpolated according to the various embodiments discussed herein. The computational logic 1280 may also include program code, etc., for an HTTP client, a web browser program ("browser"), such as a web browser based on the WebKit platform, Microsoft's Internet Explorer browser, Apple's Safari, Google's Chrome, Opera's browser, or Mozilla's Firefox browser, and/or the like, to execute and render web applications allowing a user (for example, a subscriber of on-demand services provided by the remote systems or services) of the system 1200 to access, process and view information, pages, interfaces, and applications available to it from the remote systems or services over the network 1150. In other implementations, each system 1200 may operate a user (or third party) application designed to interact with applications of the application service provider platform allowing a user (for example, a subscriber of on-demand services provided by the remote systems or services) of the system 1200 to access, process and view information, pages and applications available to it from the remote systems or services over the network 1150.

The computational logic 1280 may be stored or loaded into memory circuitry 1204 as instructions 1282, or data to create the instructions 1282, which are then accessed for execution by the processor circuitry 1202 to carry out the functions described herein. The processor circuitry 1202 accesses the memory circuitry 1204 and/or the storage circuitry 1208 over the interconnect (IX) 1206. The computational logic 1280 may execute entirely on the system 1200, partly on the system 1200 as a stand-alone software package, partly on the system 1200 and partly on a remote system (e.g., SPP 1130), or entirely on the remote system (e.g., SPP 1130). In the latter scenario, the remote computer may be connected to the system 1200 through any type of network (e.g., network 1150).

The instructions 1282 to direct the processor circuitry 1202 to perform a specific sequence or flow of actions, for example, as described with respect to flowchart(s) and block diagram(s) of operations and functionality depicted previously. The various elements may be implemented by assembler instructions supported by processor circuitry 1202 or high-level languages that may be compiled into instructions 1284, or data to create the instructions 1284, to be executed by the processor circuitry 1202. The permanent copy of the programming instructions may be placed into persistent storage devices of storage circuitry 1208 in the factory or in the field through, for example, a distribution medium (not shown), through a communication interface (e.g., from a distribution server (not shown)), or over-the-air (OTA).

In some embodiments, the storage circuitry 1208 and/or memory circuitry 1204 may include an operating system (OS) (not shown), which may be a general purpose operating system or an operating system specifically written for and tailored to the platform 1200. For example, when the system 1200 is a server system or a desktop or laptop system 1200, the OS may be Unix or a Unix-like OS such as Linux e.g., provided by Red Hat Enterprise, Windows 10™ provided by Microsoft Corp.®, macOS provided by Apple Inc.®, or the like. In another example where the system 1200 is a mobile device, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like.

The OS manages computer hardware and software resources, and provides common services for various applications. The OS may include one or more drivers or APIs that operate to control particular devices that are embedded in the system 1200, attached to the system 1200, or otherwise communicatively coupled with the system 1200. The drivers may include individual drivers allowing other components of the system 1200 to interact or control various I/O devices that may be present within, or connected to, the system 1200. For example, the drivers may include a display driver to control and allow access to a display device, a touchscreen driver to control and allow access to a touchscreen interface of the system 1200, sensor drivers to obtain sensor readings of sensor circuitry 1221 and control and allow access to sensor circuitry 1221, actuator drivers to obtain actuator positions of the actuators 1222 and/or control and allow access to the actuators 1222, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from other applications operated by the system 1200, such as the various subsystems of the CAS 200 discussed previously.

In embodiments where the processor circuitry 1202 and memory circuitry 1204 are implemented as hardware accelerators (e.g., FPGA cells) as well as processor cores, the hardware accelerators (e.g., the FPGA cells) may be pre-configured (e.g., with appropriate bit streams, logic blocks/fabric, etc.) with the logic to perform some functions of the embodiments herein (in lieu of employment of programming instructions to be executed by the processor core(s)).

The components of system 1200 communicate with one another over the interconnect (IX) 1206. The IX 1206 may include any number of IX technologies such as industry standard architecture (ISA), extended ISA (EISA), inter-integrated circuit ($I^2C$), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath Interconnect (QPI), Intel® Omni-Path Architecture (OPA) IX, RapidIO™ system interconnects, Ethernet, Cache Coherent Interconnect for Accelerators (CCIA), Gen-Z Consortium IXs, Open Coherent Accelerator Processor Interface (OpenCAPI), and/or any number of other IX technologies. The IX 1206 may be a proprietary bus, for example, used in a SoC based system. In various embodiments, IX 1206 may be a controller area network (CAN) bus system, a Time-Trigger Protocol (TTP) system, or a FlexRay system, which may allow various devices (e.g., sensor circuitry 1221, actuators 1222, etc.) to communicate with one another using messages or frames. Suitable implementations and general functionality of CAN, TTP, and FlexRay bus systems are known, and are readily implemented by persons having ordinary skill in the art.

The communication circuitry 1209 is a hardware element, or collection of hardware elements, used to communicate over one or more networks (e.g., network 950) and/or with other devices. The communication circuitry 1209 includes modem 1210 and transceiver circuitry ("TRx") 1212. The modem 1210 includes one or more processing devices (e.g., baseband processors) to carry out various protocol and radio control functions. Modem 1210 may interface with application circuitry of system 1200 for generation and processing of baseband signals and for controlling operations of the TRx 1212. The modem 1210 may handle various radio control functions that enable communication with one or more radio networks via the TRx 1212 according to one or more wireless communication protocols. The modem 1210 may include circuitry such as, but not limited to, one or more single-core or multi-core processors (e.g., one or more baseband processors) or control logic to process baseband signals received from a receive signal path of the TRx 1212, and to generate baseband signals to be provided to the TRx 1212 via a transmit signal path. In various embodiments, the modem 1210 may implement a real-time OS (RTOS) to manage resources of the modem 1210, schedule tasks, etc. The communication circuitry 1209 also includes TRx 1212 to enable communication with wireless networks using modulated electromagnetic radiation through a non-solid medium. TRx 1212 includes a receive signal path, which comprises circuitry to convert analog RF signals (e.g., an existing or received modulated waveform) into digital baseband signals to be provided to the modem 1210. The TRx 1212 also includes a transmit signal path, which comprises circuitry configured to convert digital baseband signals provided by the modem 1210 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the TRx 1212 using metal transmission lines or the like.

The TRx 1212 may include one or more radios that are compatible with, and/or may operate according to any one or more of the following radio communication technologies and/or standards including but not limited to.

Network interface circuitry/controller (NIC) 916 may be included to provide wired communication to the network 950 or to other devices using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the system 1200 via NIC 1216 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1216 may include one or more dedicated processors and/or FPGAs to communicate using one or more of the aforementioned network interface protocols. In some implementations, the NIC 1216 may include multiple controllers to provide connectivity to other networks using the same or different protocols. For example, the system 1200 may include a first NIC 1216 providing communications to the network 1150 over Ethernet and a second NIC 1216 providing communications to other devices over another type of network, such as a personal area network (PAN) including a personal computer (PC) device. In some implementations, the NIC 1216 may be a high-speed serial interface (HSSI) NIC to connect the system 1200 to a routing or switching device.

The external interface 918 (also referred to as "input/output interface circuitry," "I/O circuitry," "interface circuitry," or the like) includes circuitry configured to connect or coupled the system 1200 with external devices or subsystems. The external interface 1218 may include any suitable interface controllers and connectors to couple the system 1200 with the external components/devices. The interface controllers may include, but are not limited to, memory controllers, storage controllers (e.g., redundant array of independent disk (RAID) controllers, baseboard management controllers (BMCs), input/output controllers, host controllers, etc. The connectors may include, for example, IXs (for example, IX 1206), ports, slots, jumpers, interconnect modules, receptacles, modular connectors, etc. As an example, the external interface 1218 may be an external expansion bus (e.g., Universal Serial Bus (USB), FireWire, Thunderbolt, Lightning, etc.) used to connect system 100 with external (peripheral) components/devices. The external devices include, inter alia, sensor circuitry 1221, actuators 1222, and positioning circuitry 1245, but may also include other devices or subsystems not shown by FIG. 12.

The sensor circuitry 1221 may include devices, modules, or subsystems whose purpose is to detect events or changes in its environment, convert the detected events into electrical signals and/or digital data, and transmit/send the information (e.g., as sensor data) about the detected events to some other a device, module, subsystem, etc. Examples of such sensors 1221 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., charged-coupled devices (CCD), Complementary metal-oxide-semiconductor (CMOS) active pixel sensors (APS), lens-less image capture devices/cameras, thermographic (infrared) cameras, etc.); light detection and ranging (Li-DAR) sensors; proximity sensors (e.g., infrared radiation detector and the like), depth sensors, ambient light sensors, ultrasonic transceivers; microphones; etc.

The external interface 1218 connects the system 1200 to actuators 1224, allow system 1200 to change its state, position, and/or orientation, or move or control a mechanism or system. The actuators 1222 comprise electrical and/or mechanical devices for moving or controlling a mechanism or system, and converts energy (e.g., electric current or moving air and/or liquid) into some kind of motion. The actuators 1222 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1222 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The system 1200 may be configured to operate one or more actuators 1222 based on one or more captured events and/or instructions or control signals received from a service provider and/or various client systems. In embodiments, the system 1200 may transmit instructions to various actuators 1222 (or controllers that control one or more actuators 1222) to reconfigure an electrical network as discussed herein.

The positioning circuitry 1245 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1245 may include a Micro-Technology for Positioning, Navigation, and Timing (Micro-PNT) IC that uses a master timing clock to perform position tracking/estimation without GNSS assistance. The positioning circuitry 1245 may also be part of, or interact with, the communication circuitry 1209 to communicate with the nodes and components of the positioning network.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 1245 or portion(s) thereof) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). The GNSS receivers measure the time of arrivals (ToAs) of the GNSS signals from the plurality of GNSS nodes according to its own clock. The GNSS receivers determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 1245 may also provide position data and/or time data to the processor circuitry 1202, which may use the data to synchronize operations with various infrastructure (e.g., radio base stations, other computer systems 1101, etc.), for turn-by-turn navigation, or the like.

The input/output (I/O) devices 1256 may be present within, or connected to, the system 1200. The I/O devices 1256 include input device circuitry and output device circuitry including one or more user interfaces designed to enable user interaction with the system 1200 and/or peripheral component interfaces designed to enable peripheral component interaction with the system 1200.

The input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. In some embodiments, the sensor circuitry 1221 may be used as the input device circuitry (e.g., an image capture device, motion capture device, or the like) and one or more actuators 1222 may be used as the output device circuitry (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

The output device circuitry is used to show or convey information, such as sensor readings, actuator position(s), or other like information. Data and/or graphics may be displayed on one or more user interface components of the output device circuitry. The output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED and/or organic LED (OLED) displays, quantum dot displays, projectors, etc.), with the output of characters, graphics, multimedia objects, and the like being generated or produced from the operation of the system 1200. The output device circuitry may also include speakers or other audio emitting devices, printer(s), and/or the like.

In embodiments where a display device is embedded with the computer system 1200, signals encoded with image/graphics data may be sent to the display device over IX 1206. In other embodiments, the display device may be separate from the computer system 1200, and these signals may be sent to the display device over a suitable wired connection, such as RCA, a video graphics array (VGA), a digital visual interface (DVI) and/or mini-DVI, a high-definition multimedia interface (HDMI), S-Video, and/or the like; or over a wireless connection using one or more of the wireless communications protocols discussed previously, or one or more remote display protocols, such as wireless gigabit alliance (WiGiG) protocol, remote desktop protocol (RDP), PC-over-IP (PCoIP) protocol, high-definition experience (HDX) protocol, and/or other like remote display protocols. In some embodiments, the display device may include or couple with a dongle or other like receiving device configured to receive the one or more multimedia signals from the computer system 1200.

A battery 1224 may be coupled to the system 1200 to power the system 1200, which may be used in embodiments where the system 1200 is not in a fixed location, such as when the system 1200 is a mobile or laptop computer system. The battery 1224 may be a lithium ion battery, a lead-acid automotive battery, or a metal-air battery, such as a zinc-air battery, an aluminum-air battery, a lithium-air battery, a lithium polymer battery, and/or the like. In embodiments where the system 1200 is mounted in a fixed location, such as when the system is implemented as a server computer system, the system 1200 may have a power supply coupled to an electrical grid. In these embodiments, the system 1200 may include power tee circuitry to provide for electrical power drawn from a network cable to provide both power supply and data connectivity to the system 1200 using a single cable.

Power management integrated circuitry (PMIC) 1226 may be included in the system 1200 to track the state of charge (SoCh) of the battery 1224 (if present), and to control charging of the system 1200. The PMIC 1226 may be used to monitor other parameters of the battery 1224 to provide failure predictions, such as the state of health (SoH) and the state of function (SoF) of the battery 1224. The PMIC 1226 may include voltage regulators, surge protectors, power alarm detection circuitry. The power alarm detection circuitry may detect one or more of brown out (under-voltage) and surge (over-voltage) conditions. The PMIC 1226 may communicate the information on the battery 1224 to the processor circuitry 1202 over the IX 1206. The PMIC 1226 may also include an analog-to-digital (ADC) convertor that allows the processor circuitry 1202 to directly monitor the voltage of the battery 1224 or the current flow from the battery 1224. The battery parameters may be used to determine actions that the system 1200 may perform, such as transmission frequency, mesh network operation, sensing frequency, and the like.

A power block 1228, or other power supply coupled to an electrical grid, may be coupled with the PMIC 1226 to charge the battery 1224. In some examples, the power block 1228 may be replaced with a wireless power receiver to obtain the power wirelessly, for example, through a loop antenna in the system 1200. In these implementations, a wireless battery charging circuit may be included in the PMIC 1226. The specific charging circuits chosen depend on the size of the battery 1224 and the current required While not shown, various other devices may be present within, or connected to, the platform 1200. For example, I/O devices, such as a touchscreen or keypad may be connected to the platform 1200 via bus 1206 to accept input and display outputs. In another example, one or more of physical or virtual buttons, such as a reset button, one or more indicators such as light emitting diodes (LEDs) or the like, may be included in or connected with platform 1200 and/or the computer system 1101. In another example, the communication circuitry 1205 may include a Universal Integrated Circuit Card (UICC), embedded UICC (eUICC), and/or other elements/components that may be used to communicate over one or more wireless networks.

7. EXAMPLES

Some non-limiting examples are as follows. The following examples pertain to further embodiments, and specifics in the examples may be used anywhere in one or more embodiments discussed previously. Any of the following examples may be combined with any other example or any embodiment discussed herein.

Example A01 may include an apparatus comprising:
flow estimation means for estimating a bidirectional optical flow between at least two input frames; and
context extraction means for extracting context maps based on the estimated bidirectional flow.

Example A02 may include the apparatus of example A01 and/or some other example herein, further comprising:
warping means for pre-warping the at least two input frames and corresponding context maps of the input frames.

Example A03 may include the apparatus of example A02 and/or some other example herein, wherein:
the warping means is for feeding the warped frames and the corresponding context maps into frame synthesis means, and
the frame synthesis means is for generating an output frame at a desired temporal position.

Example A04 may include the apparatus of examples A02-A03 and/or some other example herein, wherein:
the context extraction means is for extracting per-pixel context information from the input frames as the context maps; and
the warping means is for using the bidirectional optical flow as a guide for the pre-warping of the input frames.

Example A05 may include the apparatus of example A04 and/or some other example herein, wherein the flow estimation means is for generating an intermediate frame at a temporal position in between the at least two input frames.

Example A06 may include the apparatus of examples A01-A05 and/or some other example herein, wherein the flow estimation means is for estimating the bidirectional optical flow using PWC-Net mechanisms.

Example A07 may include the apparatus of examples A02-A06 and/or some other example herein, wherein the warping means is for using forward warping, wherein the forward warping includes using the estimated bidirectional optical flow to warp each of the at least two input frames to obtain corresponding pre-warped frames.

Example A08 may include the apparatus of examples A03-A07 and/or some other example herein, wherein the frame synthesis means is for generating the output frame without resorting to pixel-wise blending.

Example A09 may include the apparatus of examples A01-A08 and/or some other example herein, wherein the context extraction means is for extracting contextual information using a response of a convolutional layer of an 18 layer residual network (ResNet-18).

Example A10 may include the apparatus of examples A03-A09 and/or some other example herein, wherein the frame synthesis means comprises a neural network.

Example A11 may include the apparatus of example A10 and/or some other example herein, wherein the neural network comprises an extended grid network (GridNet), wherein the GridNet comprises a grid of one or more rows and one or more columns.

Example A12 may include the apparatus of example A11 and/or some other example herein, wherein the GridNet comprises three rows and six columns, and wherein the layers in each of the three rows form a stream in which feature resolution is kept constant, each of the three streams process information at a different scale from one another, and each of the six columns connect the streams to exchange information by using down-sampling and upsampling layers.

Example A13 may include the apparatus of example A11 and/or some other example herein, wherein each row and each column comprise one or more Parametric Rectified Linear Units (PReLUs) and one or more convolution layers, wherein each convolution layer is disposed between the PReLUs.

Example A14 may include the apparatus of examples A03-A13 and/or some other example herein, wherein the frame synthesis means is for measuring a difference between the output frame and a ground truth frame.

Example A15 may include the apparatus of example A14 and/or some other example herein, wherein the measuring is to take place during a training period, and wherein the ground truth frame comprises a center frame of a set of frames from among a plurality of frame sets of a training dataset.

Example B01 may include an apparatus configured to:
estimate a bidirectional optical flow between at least two input frames;
extract context maps based on the estimated bidirectional flow;
pre-warp the at least two input frames and corresponding context maps of the input frames;
feed the pre-warped frames and the corresponding context maps into frame synthesis neural network; and
operate the frame synthesis neural network to generate an output frame at a desired temporal position.

Example B02 may include the apparatus of example B01 and/or some other example herein, wherein, to extract the context maps, the apparatus is configured to:
extract per-pixel context information from the input frames as the context maps.

Example B03 may include the apparatus of example B02 and/or some other example herein, wherein, to pre-warp the at least two input frames, the apparatus is configured to:
use the bidirectional optical flow as a guide for the pre-warping of the input frames.

Example B04 may include the apparatus of examples B01-B03 and/or some other example herein, wherein the apparatus is configured to:
generate an intermediate frame at a temporal position in between the at least two input frames.

Example B05 may include the apparatus of examples B01-B04 and/or some other example herein, wherein the apparatus is configured to:
estimate the bidirectional optical flow using a PWC-Net mechanism.

Example B06 may include the apparatus of examples B01-B05 and/or some other example herein, wherein the apparatus is configured to:
use forward warping, wherein the estimated bidirectional optical flow is used to warp each of the at least two input frames to obtain corresponding pre-warped frames.

Example B07 may include the apparatus of examples B01-B06 and/or some other example herein, wherein the apparatus is configured to operate the frame synthesis neural network to generate the output frame without performing pixel-wise blending.

Example B08 may include the apparatus of examples B01-B07 and/or some other example herein, wherein the apparatus is configured to extract contextual information using a response of a convolutional layer of an 18 layer residual network (ResNet-18).

Example B09 may include the apparatus of examples B01-B07 and/or some other example herein, wherein the frame synthesis neural network comprises an extended grid network (GridNet), wherein the GridNet comprises a grid of one or more rows and one or more columns.

Example B10 may include the apparatus of example B09 and/or some other example herein, wherein the GridNet comprises three rows and six columns, and wherein the layers in each of the three rows form a stream in which feature resolution is kept constant, each of the three streams process information at a different scale from one another, and each of the six columns connect the streams to exchange information by using down-sampling and upsampling layers.

Example B11 may include the apparatus of example B09 and/or some other example herein, wherein each row and each column comprise one or more Parametric Rectified Linear Units (PReLUs) and one or more convolution layers, wherein each convolution layer is disposed between the PReLUs.

Example B12 may include the apparatus of examples B01-B11 and/or some other example herein, wherein the apparatus is configured to operate the frame synthesis neural network to measure a difference between the output frame and a ground truth frame.

Example B13 may include the apparatus of example B12 and/or some other example herein, wherein the measuring is to take place during a training period, and wherein the ground truth frame comprises a center frame of a set of frames from among a plurality of frame sets of a training dataset.

Example B14 may include the apparatus of examples B01-B13 and/or some other example herein, wherein the apparatus comprises processor circuitry implemented in a computer device.

Example B15 may include the apparatus of example B14 and/or some other example herein, wherein the computer device comprises memory circuitry communicatively coupled with the processor circuitry, and communication circuitry communicatively coupled with the processor circuitry.

Example C01 may include a method comprising:
estimating a bidirectional optical flow between at least two input frames; and
extracting context maps based on the estimated bidirectional flow.

Example C02 may include the method of example C01 and/or some other example herein, further comprising:
pre-warping the at least two input frames and corresponding context maps of the input frames.

Example C03 may include the method of example C02 and/or some other example herein, further comprising:
feeding the warped frames and the corresponding context maps into frame synthesis neural network; and
operating the frame synthesis neural network to generate an output frame at a desired temporal position.

Example C04 may include the method of examples C02-C03 and/or some other example herein, further comprising:
extracting per-pixel context information from the input frames as the context maps; and
using the bidirectional optical flow as a guide for the pre-warping of the input frames.

Example C05 may include the method of example C04 and/or some other example herein, further comprising generating an intermediate frame at a temporal position in between the at least two input frames.

Example C06 may include the method of examples C01-C05 and/or some other example herein, further comprising estimating the bidirectional optical flow using PWC-Net mechanisms.

Example C07 may include the method of examples C02-C06 and/or some other example herein, further comprising using forward warping, wherein the forward warping includes using the estimated bidirectional optical flow to warp each of the at least two input frames to obtain corresponding pre-warped frames.

Example C08 may include the method of examples C03-C07 and/or some other example herein, further comprising generating the output frame without resorting to pixel-wise blending.

Example C09 may include the method of examples C01-C08 and/or some other example herein, further comprising extracting contextual information using a response of a convolutional layer of an 18 layer residual network (ResNet-18).

Example C10 may include the method of example C09 and/or some other example herein, wherein the frame synthesis neural network comprises an extended grid network (GridNet), wherein the GridNet comprises a grid of one or more rows and one or more columns.

Example C11 may include the method of example C10 and/or some other example herein, wherein the GridNet comprises three rows and six columns, and wherein the layers in each of the three rows form a stream in which feature resolution is kept constant, each of the three streams process information at a different scale from one another, and each of the six columns connect the streams to exchange information by using down-sampling and upsampling layers.

Example C12 may include the method of example C10 and/or some other example herein, wherein each row and each column comprise one or more Parametric Rectified Linear Units (PReLUs) and one or more convolution layers, wherein each convolution layer is disposed between the PReLUs.

Example C13 may include the method of examples C03-C12 and/or some other example herein, further comprising operating the frame synthesis neural network to measure a difference between the output frame and a ground truth frame.

Example C14 may include the method of example C13 and/or some other example herein, wherein the measuring is to take place during a training period, and wherein the ground truth frame comprises a center frame of a set of frames from among a plurality of frame sets of a training dataset.

Example C15 may include the method of examples C01-C14 and/or some other example herein, wherein the method is to be performed by a computer device.

In the preceding detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments. Also, it is noted that example embodiments may be described as a process depicted as successive operations and/or with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function a main function.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group) that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "module" may refer to one or more independent electronic circuits packaged onto a circuit board, System-on-Chip (SoC), System-in-Package (SiP), Multi-Chip-Package (MCP), etc., configured to provide a basic function within a computer system. The term "module" may refer to, be part of, or include an FPGA, ASIC, a processor (shared, dedicated, or group) and/or memory (shared, dedicated, or group) that execute one or more software or firmware programs, a combinational logic circuit, and/or other suitable components that provide the described functionality.

As used herein, the term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. Example embodiments described herein may be implemented by computer hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and/or any other type of computer-executable instructions or combinations thereof. The computer-executable instructions for the disclosed embodiments and implementations can be realized in any combination of one or more programming languages that can be executed on a computer system or like device such as, for example, an object oriented programming language such as Python, PyTorch, Ruby, Scala, Smalltalk, Java™, C++, C #, or the like; a procedural programming languages, such as the "C" programming language, Go (or "Golang"), or the like; a scripting language such as JavaScript, Server-Side JavaScript (SSJS), PHP, Pearl, Python, PyTorch, Ruby or Ruby on Rails, Lua, Torch/Lua with Just-In Time compiler (LuaJIT), Accelerated Mobile Pages Script (AMPscript), VBScript, and/or the like; a markup language such as Hypertext Markup Language (HTML), Extensible Markup Language (XML), wiki markup or Wikitext, Wireless Markup Language (WML), etc.; a data interchange format/definition such as Java Script Object Notion (JSON), Apache® MessagePack™, etc.; a stylesheet language such as Cascading Stylesheets (CSS), extensible stylesheet language (XSL), or the like; an interface definition language (IDL) such as Apache® Thrift, Abstract Syntax Notation One (ASN.1), Google® Protocol Buffers (protobuf), etc.; or some other suitable programming languages including proprietary programming languages and/or development tools, or any other languages or tools as discussed herein.

As used herein, the terms "instantiate," "instantiation," and the like may refer to the creation of an instance, and an "instance" may refer to a concrete occurrence of an object, which may occur, for example, during execution of program code. Additionally, an "application instance" may be a realized software program executed in mobile edge host, which can provide service(s) to serve consumer(s). As used herein, the term "sampling" refers to a process of converting an analog signal into a number of data points at different times, and the term "quantization" refers to the number of data points used in a given sample.

As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in blockchain implementations, and/or the like. Data structures and/or database objects may be any suitable collection of data or information, and may comprise, for example, arrays, linked lists, multimaps, multisets, records, tuples, structs, containers, and/or the like. A "table" is a viewable representation of one or more database objects that are logically arranged as rows or records and including one or more data categories logically arranged as columns or fields. Each element of a table includes an instance of data for each category defined by the fields.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, webpages, web applications, and/or the like. The term "network resource" may refer to a resource hosted by a remote entity and accessible over a network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. Additionally, a "virtualized resource" may refer to compute, storage, and/or network resources provided by virtualization infrastructure to an application, such as a mobile edge application.

As used herein, the term "content" refers to visual or audible information to be conveyed to a particular audience or end-user, and may include or convey information pertaining to specific subjects or topics. Content or content items may be different content types (e.g., text, image, audio, video, etc.), and/or may have different formats (e.g., text files including Microsoft® Word® documents, Portable Document Format (PDF) documents, HTML documents; audio files such as MPEG-4 audio files and WebM audio and/or video files; etc.). The term "document" may refer to a computer file or resource used to record data, and includes various file types or formats such as word processing, spreadsheet, slide presentation, multimedia items, and the like. As used herein, the term "service" refers to a particular functionality or a set of functions to be performed on behalf of a requesting party, such as any of the computing systems or devices discussed herein. A service may include or involve the retrieval of specified information or the execution of a set of operations.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. The various wireless communications discussed herein may be include or be compatible with, but not limited to, any one or more of the following radio communication technologies and/or standards including: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDM2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 8 (3rd Generation Partnership Project Release 8), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDM2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 1600.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), LoRaWAN™ (Long Range Wide Area Network), Sigfox, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), etc. In addition to the standards listed above, any number of satellite uplink technologies may be used for the TRx 1212 including, for example, radios compliant with standards issued by the ITU (International Telecommunication Union), or the ETSI (European Telecommunications Standards Institute), among others, both existing and not yet formulated.

As used herein, the term "device" may refer to a physical entity embedded inside, or attached to, another physical entity in its vicinity, with capabilities to convey digital information from or to that physical entity. As used herein, the term "element" may refer to a unit that is indivisible at a given level of abstraction and has a clearly defined boundary, wherein an element may be any type of entity. As used herein, the term "controller" may refer to an element or entity that has the capability to affect a physical entity, such as by changing its state or causing the physical entity to move. As used herein, the term "entity" may refer to a distinct component of an architecture or device, or information transferred as a payload.

As used herein, the term "computer system" refers to any type interconnected electronic devices, computer devices, or components thereof. Additionally, the term "computer system" and/or "system" may refer to various components of a computer that are communicatively coupled with one another, or otherwise organized to accomplish one or more functions. Furthermore, the term "computer system" and/or "system" may refer to multiple computer devices and/or multiple computing systems that are communicatively coupled with one another and configured to share computing and/or networking resources. Additionally, the terms "computer system" may be considered synonymous to, and may hereafter be occasionally referred to, as a computer device, computing device, computing platform, client device, client, mobile, mobile device, user equipment (UE), terminal, receiver, server, etc., and may describe any physical hardware device capable of sequentially and automatically carrying out a sequence of arithmetic or logical operations; equipped to record/store data on a machine readable medium; and transmit and receive data from one or more other devices in a communications network.

Examples of "computer devices", "computer systems", "user equipment", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

The term "server" as used herein refers to a computing device or system, including processing hardware and/or process space(s), an associated storage medium such as a memory device or database, and, in some instances, suitable application(s) as is known in the art. The terms "server system" and "server" may be used interchangeably herein. that provides access to a pool of physical and/or virtual resources. The various servers discussed herein include computer devices with rack computing architecture component(s), tower computing architecture component(s), blade computing architecture component(s), and/or the like. The servers may represent a cluster of servers, a server farm, a cloud computing service, or other grouping or pool of servers, which may be located in one or more datacenters. The servers may also be connected to, or otherwise associated with one or more data storage devices (not shown). Moreover, the servers may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for transmitting and receiving information.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein.

Therefore, it is manifestly intended that embodiments described herein be limited only by the claims.

8. REFERENCES

[R01] S. Baker, D. Scharstein, J. P. Lewis, S. Roth, M. J. Black, and R. Szeliski. A database and evaluation methodology for optical flow. *International Journal of Computer Vision*, 92(1):1-31, 2011.

[R02] A. Bansal, X. Chen, B. Russell, A. Gupta, and D. Ramanan. PixelNet: Representation of the pixels, by the pixels, and for the pixels. arXiv/1702.06506, 2017.

[R03] P. Bojanowski, A. Joulin, D. Lopez-Paz, and A. Szlam. Optimizing the latent space of generative networks. arXiv/17070.05776, 2017.

[R04] D. J. Butler, J. Wulff, G. B. Stanley, and M. J. Black. A naturalistic open source movie for optical flow evaluation. In *European Conference on Computer Vision*, pages 611-625, 2012.

[R05] Q. Chen and V. Koltun. Photographic image synthesis with cascaded refinement networks. In *IEEE International Conference on Computer Vision*, October 2017.

[R06] S. Chetlur, C. Woolley, P. Vandermersch, J. Cohen, J. Tran, B. Catanzaro, and E. Shelhamer. cuDNN: Efficient primitives for deep learning. arXiv/1410.0759, 2014.

[R07] A. Dosovitskiy and T. Brox. Generating images with perceptual similarity metrics based on deep networks. In *Advances in Neural Information Processing Systems*, pages 658-666, 2016.

[R08] A. Dosovitskiy, P. Fischer, E. Ilg, P. Häusser, C. Hazirbas, V. Golkov, P. van der Smagt, D. Cremers, and T. Brox. FlowNet: Learning optical flow with convolutional networks. In *IEEE International Conference on Computer Vision*, pages 2758-2766, 2015.

[R09] D. Fourure, R. Emonet, É. Fromont, D. Muselet, A. Trémeau, and C. Wolf Residual conv-deconv grid network for semantic segmentation. In *British Machine Vision Conference*, 2017.

[R10] D. Gadot and L. Wolf. PatchBatch: A batch augmented loss for optical flow. In *IEEE Conference on Computer Vision and Pattern Recognition*, pages 4236-4245, 2016.

[R11] R. Goroshin, M. Mathieu, and Y. LeCun. Learning to linearize under uncertainty. In *Advances in Neural Information Processing Systems*, pages 1234-1242, 2015.

[R12] K. He, X. Zhang, S. Ren, and J. Sun. Delving deep into rectifiers: Surpassing human-level performance on ImageNet classification. In *IEEE International Conference on Computer Vision*, pages 1026-1034, 2015.

[R13] K. He, X. Zhang, S. Ren, and J. Sun. Deep residual learning for image recognition. In *IEEE Conference on Computer Vision and Pattern Recognition*, pages 770-778, 2016.

[R14] E. Herbst, S. Seitz, and S. Baker. Occlusion reasoning for temporal interpolation using optical flow. Technical report, August 2009.

[R15] S. Ioffe and C. Szegedy. Batch normalization: Accelerating deep network training by reducing internal covariate shift. In *International Conference on Machine Learning*, volume 37, pages 448-456, 2015.

[R16] J. Janai, F. Guney, J. Wulff, M. J. Black, and A. Geiger. Slow flow: Exploiting high-speed cameras for accurate and diverse optical flow reference data. In *IEEE Conference on Computer Vision and Pattern Recognition*, July 2017.

[R17] J. Johnson, A. Alahi, and L. Fei-Fei. Perceptual losses for real-time style transfer and super-resolution. In *European Conference on Computer Vision*, volume 9906, pages 694-711, 2016.

[R18] S. B. Kang, Y. Li, X. Tong, and H. Shum. Image-based rendering. *Foundations and Trends in Computer Graphics and Vision*, 2(3), 2006.

[R19] D. P. Kingma and J. Ba. Adam: A method for stochastic optimization. arXiv: 1412. 6980, 2014.

[R20] T. Kroeger, R. Timofte, D. Dai, and L. V. Gool. Fast optical flow using dense inverse search. In *European Conference on Computer Vision*, pages 471-488, 2016.

[R21] C. Ledig, L. Theis, F. Huszar, J. Caballero, A. P. Aitken, A. Tejani, J. Totz, Z. Wang, and W. Shi. Photo-realistic single image super-resolution using a generative adversarial network. arXiv/1609.04802, 2016.

[R22] B. Lim, S. Son, H. Kim, S. Nah, and K. M. Lee. Enhanced deep residual networks for single image super-resolution. In *CVPR Workshops*, pages 1132-1140, 2017.

[R23] Z. Liu, R. A. Yeh, X. Tang, Y. Liu, and A. Agarwala. Video frame synthesis using deep voxel flow. In *IEEE International Conference on Computer Vision*, October 2017.

[R24] G. Long, L. Kneip, J. M. Alvarez, H. Li, X. Zhang, and Q. Yu. Learning image matching by simply watching video. In *European Conference on Computer Vision*, volume 9910, pages 434-450, 2016.

[R25] J. Long, E. Shelhamer, and T. Darrell. Fully convolutional networks for semantic segmentation. In *IEEE Conference on Computer Vision and Pattern Recognition*, pages 3431-3440, 2015.

[R26] W. Luo, Y. Li, R. Urtasun, and R. S. Zemel. Understanding the effective receptive field in deep convolutional neural networks. In *Advances in Neural Information Processing Systems*, pages 4898-4906, 2016.

[R27] M. Mathieu, C. Couprie, and Y. LeCun. Deep multi-scale video prediction beyond mean square error. In *International Conference on Learning Representations*, 2016.

[R28] M. Menze and A. Geiger. Object scene flow for autonomous vehicles. In *IEEE Conference on Computer Vision and Pattern Recognition*, pages 3061-3070, 2015.

[R29] S. Meyer, O. Wang, H. Zimmer, M. Grosse, and A. Sorkine-Hornung. Phase-based frame interpolation for video. In *IEEE Conference on Computer Vision and Pattern Recognition*, pages 1410-1418, 2015.

[R30] S. Nah, T. Hyun Kim, and K. Mu Lee. Deep multi-scale convolutional neural network for dynamic scene deblurring. In *IEEE Conference on Computer Vision and Pattern Recognition*, July 2017.

[R31] S. Niklaus, L. Mai, and F. Liu. Video frame interpolation via adaptive convolution. In *IEEE Conference on Computer Vision and Pattern Recognition*, July 2017.

[R32] S. Niklaus, L. Mai, and F. Liu. Video frame interpolation via adaptive separable convolution. In *IEEE International Conference on Computer Vision*, October 2017.

[R33] A. Odena, V. Dumoulin, and C. Olah. Deconvolution and checkerboard artifacts. Distill, 2016. http://distill.pub/2016/deconv-checkerboard.

[R34] T. Pohlen, A. Hermans, M. Mathias, and B. Leibe. Full resolution residual networks for semantic segmentation in street scenes. In *IEEE Conference on Computer Vision and Pattern Recognition*, pages 3309-3318, 2017.

[R35] L. L. Rakêt, L. Roholm, A. Bruhn, and J. Weickert. Motion compensated frame interpolation with a symmetric optical flow constraint. In *Advances in Visual Computing*, volume 7431, pages 447-457, 2012.

[R36] A. Ranjan and M. J. Black. Optical flow estimation using a spatial pyramid network. arXiv/1611.00850, 2016.

[R37] M. Ranzato, A. Szlam, J. Bruna, M. Mathieu, R. Collobert, and S. Chopra. Video (language) modeling: a baseline for generative models of natural videos. arXiv/1412.6604, 2014.

[R38] M. S. M. Sajjadi, B. Scholkopf, and M. Hirsch. EnhanceNet: Single image super-resolution through automated texture synthesis. arXiv/1612.07919, 2016.

[R39] K. Simonyan and A. Zisserman. Very deep convolutional networks for large-scale image recognition. arXiv/1409. 1556, 2014.

[R40] N. Srivastava, E. Mansimov, and R. Salakhutdinov. Unsupervised learning of video representations using LSTMs. In *International Conference on Machine Learning*, volume 37, pages 843-852, 2015.

[R41] D. Sun, X. Yang, M. Liu, and J. Kautz. Pwc-net: Cnns for optical flow using pyramid, warping, and cost volume. arXiv/1709.02371, 2017.

[R42] R. Szeliski. *Computer vision: algorithms and applications*. Springer Science & Business Media, 2010.

[R43] D. Ulyanov, A. Vedaldi, and V. S. Lempitsky. Instance normalization: The missing ingredient for fast stylization. arXiv/1607.08022, 2016.

[R44] Z. Wang, A. C. Bovik, H. R. Sheikh, and E. P. Simoncelli. Image quality assessment: from error visibility to structural similarity. *IEEE Transactions on Image Processing*, 13(4):600-612, 2004.

[R45] P. Weinzaepfel, J. Revaud, Z. Harchaoui, and C. Schmid. DeepFlow: Large displacement optical flow with deep matching. In *IEEE International Conference on Computer Vision*, pages 1385-1392, 2013.

[R46] M. Werlberger, T. Pock, M. Unger, and H. Bischof. Optical flow guided TV-L 1 video interpolation and restoration. In *Energy Minimization Methods in Computer Vision and Pattern Recognition*, volume 6819, pages 273-286, 2011.

[R47] J. Xu, R. Ranftl, and V. Koltun. Accurate optical flow via direct cost volume processing. In *IEEE Conference on Computer Vision and Pattern Recognition*, pages 5807-5815, 2017.

[R48] L. Xu, J. Jia, and Y. Matsushita. Motion detail preserving optical flow estimation. *IEEE Transactions on Pattern Analysis and Machine Intelligence*, 34(9):1744-1757, 2012.

[R49] Z. Yu, H. Li, Z. Wang, Z. Hu, and C. W. Chen. Multi-level video frame interpolation: Exploiting the interaction among different levels. *IEEE Trans. Circuits Syst. Video Techn.*, 23(7):1235-1248, 2013.

[R50] T. Zhou, S. Tulsiani, W. Sun, J. Malik, and A. A. Efros. View synthesis by appearance flow. In *European Conference on Computer Vision*, volume 9908, pages 286-301, 2016.

[R51] J. Zhu, P. Krähenbühl, E. Shechtman, and A. A. Efros. Generative visual manipulation on the natural image manifold. In *European Conference on Computer Vision*, volume 9909, pages 597-613, 2016.

The invention claimed is:

1. A computer system comprising:
processor circuitry coupled with memory circuitry, the memory circuitry is arranged to store program code of flow estimation logic, context extraction logic, warping logic, and frame synthesis neural network (FSNN) logic, and the processor circuitry is arranged to:
operate the flow estimation logic to estimate a bidirectional optical flow between at least two input frames;
operate the context extraction logic to extract context maps based on the estimated bidirectional optical flow;
operate the warp logic to pre-warp the at least two input frames and corresponding context maps of the at least two input frames;
operate the warp logic to feed the pre-warped frames and the corresponding context maps into an FSNN of the FSNN logic; and
operate the FSNN logic to generate an output frame at a desired temporal position based on the pre-warped frames.

2. The computer system of claim 1, wherein, to extract the context maps, the processor circuitry is arranged to operate the context extraction logic to extract per-pixel context information from the input frames as the context maps.

3. The computer system of claim 2, wherein, to pre-warp the at least two input frames, the processor circuitry is arranged to operate the warping logic to use the bidirectional optical flow as a guide for the pre-warping of the input frames.

4. The computer system of claim 1, wherein the processor circuitry is arranged to operate the flow estimation logic to generate an intermediate frame at a temporal position in between the at least two input frames.

5. The computer system of claim 1, wherein the processor circuitry is arranged to operate the flow estimation logic to estimate the bidirectional optical flow using a Pyramidal processing, Warping, and Cost volume-Network (PWC-Net) mechanism.

6. The computer system of claim 1, wherein the processor circuitry is arranged to operate the warping logic to use forward warping, wherein the estimated bidirectional optical flow is used to warp each of the at least two input frames to obtain corresponding pre-warped frames.

7. The computer system of claim 1, wherein the processor circuitry is arranged to operate the FSNN logic to generate the output frame without performing pixel-wise blending.

8. The computer system of claim 1, wherein the processor circuitry is to operate the context extraction logic to extract contextual information using a response of a convolutional layer of an 18 layer residual network (ResNet-18).

9. The computer system of claim 8, wherein the FSNN comprises an extended grid network (GridNet), wherein the GridNet comprises a grid of one or more rows and one or more columns, wherein each row and each column comprise one or more Parametric Rectified Linear Units (PReLUs) and one or more convolution layers, wherein each convolution layer is disposed between the PReLUs.

10. The computer system of claim 1, wherein the processor circuitry is arranged to operate the FSNN logic to measure a difference between the output frame and a ground truth frame during a training period, and wherein the ground truth frame comprises a center frame of a set of frames from among a plurality of frame sets of a training dataset.

11. A computer-implemented method comprising:
estimating a bidirectional optical flow between at least two input frames;
extracting context maps based on the estimated bidirectional optical flow, wherein the context maps comprise per-pixel context information from the at least two input frames;
warping the at least two input frames and corresponding context maps of the at least two input frames, wherein the warping comprises using the bidirectional optical flow as a guide for the warping;
feeding the warped frames and the corresponding context maps into a frame synthesis neural network (FSNN); and
operating the FSNN to generate an output frame at a desired temporal position based on the warped frames.

12. The method of claim 11, wherein the method comprises: estimating the bidirectional optical flow using a Pyramidal processing, Warping, and Cost volume-Network (PWC-Net) mechanism.

13. The method of claim 11, wherein the method comprises:
operating the FSNN to generate the output frame without performing pixel-wise blending.

14. The method of claim 11, wherein the method comprises:
generating an intermediate frame at the temporal position in between the at least two input frames.

15. The method of claim 11, wherein the method comprises:
operating the FSNN to measure a difference between the output frame and a ground truth frame during a training period, wherein the ground truth frame comprises a center frame of a set of frames from among a plurality of frame sets of a training dataset.

16. One or more non-transitory computer-readable media (NTCRM) comprising instructions, wherein execution of the instructions by one or more processors of a computing system is operable to cause the computing system to:
estimate a bidirectional optical flow between at least two input frames;
extract context maps based on the estimated bidirectional optical flow;

warp the at least two input frames and corresponding context maps of the at least two input frames;

feed the warped frames and the corresponding context maps into a frame synthesis neural network (FSNN); and operate the FSNN to generate an output frame at a desired temporal position based on the warped frames.

17. The one or more NTCRM of claim 16, wherein execution of the instructions is further operable to cause the computing system to:

extract per-pixel context information from the input frames as the context maps; and use the bidirectional optical flow as a guide to warp the input frames.

18. The one or more NTCRM of claim 17, wherein execution of the instructions is further operable to cause the computing system to:

generate an intermediate frame at a temporal position in between the at least two input frames.

19. The one or more NTCRM of claim 16, wherein execution of the instructions is further operable to cause the computing system to:

estimate the bidirectional optical flow using a Pyramidal processing, Warping, and Cost volume-Network (PWC-Net) mechanism.

20. The one or more NTCRM of claim 16, wherein, to warp the at least two input frames, execution of the instructions is further operable to cause the computing system to:

perform forward warping on the at least two input frames, wherein, to perform forward warping, execution of the instructions is further operable to cause the computing system to:

use the estimated bidirectional optical flow to warp each of the at least two input frames to obtain corresponding warped frames.

21. The one or more NTCRM of claim 16, wherein, to operate the FSNN, execution of the instructions is further operable to cause the computing system to:

generate the output frame without resorting to pixel-wise blending.

22. The one or more NTCRM of claim 16, wherein execution of the instructions is further operable to cause the computing system to:

extract contextual information using a response of a convolutional layer of a multi-layer residual network.

23. The one or more NTCRM of claim 22, wherein the multi-layer residual network is an 18 layer residual network (ResNet-18), the FSNN comprises an extended grid network (GridNet), and the GridNet comprises a grid of one or more rows and one or more columns.

24. The one or more NTCRM of claim 23, wherein each row and each column comprise one or more Parametric Rectified Linear Units (PReLUs) and one or more convolution layers disposed between the one or more PReLUs.

25. The one or more NTCRM of claim 24, wherein execution of the instructions is further operable to cause the computing system to:

operate the FSNN, during a training phase, to measure a difference between the output frame and a ground truth frame, the ground truth frame comprising a center frame of a set of frames from among a plurality of frame sets of a training dataset.

\* \* \* \* \*